(12) United States Patent
Okazaki et al.

(10) Patent No.: US 10,384,115 B2
(45) Date of Patent: Aug. 20, 2019

(54) SWING ANALYSIS INCLUDING WRIST COCK STRENGTH DISPLAY

(71) Applicant: SUMITOMO RUBBER INDUSTRIES, LTD., Kobe-shi (JP)

(72) Inventors: Kousuke Okazaki, Kobe (JP); Masahiko Ueda, Kobe (JP); Yuto Nakamura, Kobe (JP); Satoru Hanamitsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/618,663

(22) Filed: Jun. 9, 2017

(65) Prior Publication Data

US 2017/0354859 A1 Dec. 14, 2017

(30) Foreign Application Priority Data

Jun. 12, 2016 (JP) .................................. 2016-116739

(51) Int. Cl.
| | | |
|---|---|---|
| A63B 24/00 | (2006.01) | |
| A63B 69/36 | (2006.01) | |
| A63B 71/06 | (2006.01) | |
| G09B 19/00 | (2006.01) | |

(52) U.S. Cl.
CPC .......... *A63B 71/0622* (2013.01); *A63B 69/36* (2013.01); *G09B 19/0038* (2013.01); *A63B 2225/50* (2013.01)

(58) Field of Classification Search
CPC . A63B 69/36; A63B 2220/40; A63B 2220/44; A63B 24/0003; A63B 24/0006; A63B 60/46; G09B 19/0038
See application file for complete search history.

(56) References Cited

U.S. PATENT DOCUMENTS

| | | | |
|---|---|---|---|
| 2014/0135139 A1* | 5/2014 | Shibuya ............. | A63B 24/0006 473/207 |
| 2015/0224371 A1 | 8/2015 | Kato | |
| 2015/0367174 A1 | 12/2015 | Okazaki et al. | |
| 2016/0199693 A1* | 7/2016 | Vermilyea ............ | A61B 5/6831 700/91 |

FOREIGN PATENT DOCUMENTS

| | | |
|---|---|---|
| JP | 2014-121412 A | 7/2014 |
| JP | 2014-212862 A | 11/2014 |
| JP | 2016-2429 A | 1/2016 |
| JP | 2016-2430 A | 1/2016 |

* cited by examiner

*Primary Examiner* — Lawrence S Galka
(74) *Attorney, Agent, or Firm* — Birch, Stewart, Kolasch & Birch, LLP

(57) ABSTRACT

Provided is a GUI display device that is able to explain the movement for holding the wrist cock and the movement for releasing the wrist cock during a golf swing visually in easily understandable manner. The GUI display device includes a display control part. The display control part simultaneously displays, on the GUI screen, a first graphic $G_1(i)$ representing a strength with which a wrist cock is held at an i-th timing during a swing motion of a golf club, and a second graphic $G_2(i)$ representing the strength with which the wrist cock is released at the i-th timing, where $i=1, 2, \ldots, N$ (N being an integer of 2 or more).

2 Claims, 29 Drawing Sheets

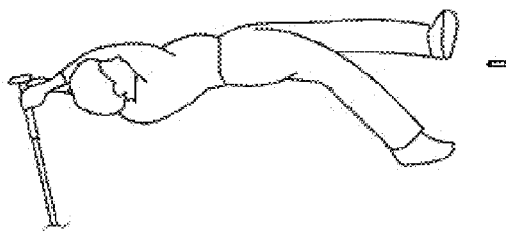
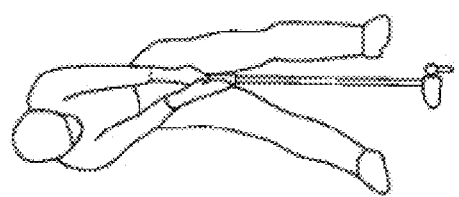
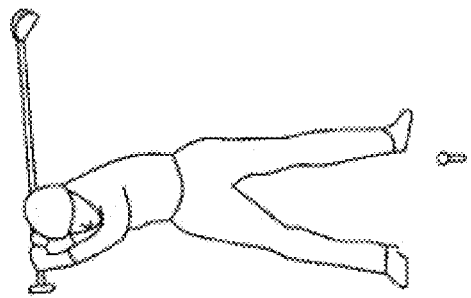
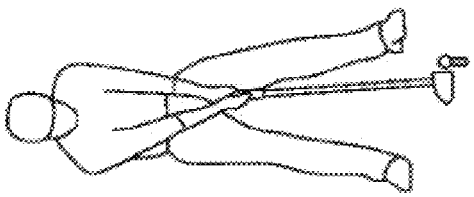

SWING ANALYSIS INCLUDING WRIST COCK STRENGTH DISPLAY

The present invention relates to a GUI display device configured to display GUI (graphical user interface) screens relating to the swing motion of a golf club.

Heretofore, devices configured to measure the swing motion of a golf club by a golfer using a measuring device and analyze the swing motion based on measurement data are well known such as JP 2014-121412A (hereinafter called "Patent Literature 1"). In such analysis situations, the analysis algorithm itself is naturally important, but it is also important to explain the analysis result to the user in an easily understandable manner. Patent Literature 1 discloses GUI screens that enable the analysis results of a golf swing to be visualized in an easily understandable manner using graphs and the like. Note that such analysis results of a golf swing are utilized in various applications, such as fitting golf clubs suitable for a golfer and improving a golfer's swing shape.

SUMMARY OF INVENTION

Incidentally, during a golf swing, a movement for holding the wrist cock and a movement for releasing the wrist cock are carried out, and such movements serve as indicators characterizing a golfer's swing motion. Accordingly, the inventors considered it important to be able to analyze the strength of these movements peculiar to a golfer, and to present the analysis results to the golfer. However, many general golfers do not understand the significance of the movement for holding the wrist cock and the movement for releasing the wrist cock.

One object of the present invention is to provide a GUI display device that is able to explain the movement for holding the wrist cock and the movement for releasing the wrist cock during a golf swing visually in easily understandable manner.

A GUI display device according to a first aspect is a GUI display device configured to display a GUI screen, including a display control part. The display control part simultaneously displays, on the GUI screen, a first graphic $G_1(i)$ representing a strength with which a wrist cock is held at an i-th timing during a swing motion of a golf club, and a second graphic $G_2(i)$ representing a strength with which the wrist cock is released at the i-th timing, where $i=1, 2, \ldots, N$ (N being an integer of 2 or more).

A GUI display device according to a second aspect is the GUI display device according to the first aspect, in which the display control part displays an image $I(i)$ simultaneously displaying the first graphic $G_1(i)$ and the second graphic $G_2(i)$ on the GUI screen in a mode of a moving image in time sequence where $i=1, 2, \ldots, N$.

A GUI display device according to a third aspect is the GUI display device according to the first aspect, in which the display control part displays an image $I(i)$ simultaneously displaying the first graphic $G_1(i)$ and the second graphic $G_2(i)$ on the GUI screen in a mode of being arrayed in time sequence where $i=1, 2, \ldots, N$.

A GUI display device according to a fourth aspect is the GUI display device according to any of the first aspect to the third aspect, in which the display control part simultaneously displays, on the GUI screen, in addition to the first graphic $G_1(i)$ and the second graphic $G_2(i)$, an arm graphic $G_3(i)$, which is a graphic representing an arm of a golfer at the i-th timing, and a club graphic $G_4(i)$, which is a graphic representing the golf club at the i-th timing, where $i=1, 2, \ldots, N$ (N being an integer of 2 or more).

A GUI display device according to a fifth aspect is the GUI display device according to the fourth aspect, in which the display control part displays, on the GUI screen, the first graphic $G_1(i)$ to overlap or be in a vicinity of the arm graphic $G_3(i)$, and the second graphic $G_2(i)$ to overlap or be in a vicinity of the club graphic $G_4(i)$, where $i=1, 2, \ldots, N$ (N being an integer of 2 or more).

A GUI display device according to a sixth aspect is the GUI display device according to any of the first aspect to the fifth aspect, further including an acquisition part and a calculation part. The acquisition part acquires measurement data obtained by measuring a swing motion of the golf club by a golfer. The calculation part calculates, based on the measurement data, a first indicator representing the strength with which the wrist cock is held, and a second indicator representing the strength with which the wrist cock is released. The display control part displays the first indicator and the second indicator on the GUI screen.

A GUI display device according to a seventh aspect is the GUI display device according to the sixth aspect, further including a determination part. The determination part determines an optimal shaft weight, which is a shaft weight suitable for the golfer, according to the first indicator and the second indicator. The display control part displays the optimal shaft weight on the GUI screen.

A GUI display program according to an eighth aspect is a GUI display program that displays a GUI screen, and causes a computer to execute the following (1) step.

(1) A step of simultaneously displaying, on the GUI screen, a first graphic $G_1(i)$ representing a strength with which a wrist cock is held at an i-th timing during a swing motion of a golf club, and a second graphic $G_2(i)$ representing a strength with which the wrist cock is released at the i-th timing, where $i=1, 2, \ldots, N$ (N being an integer of 2 or more).

A GUI display device according to a ninth aspect is a GUI display device configured to display a GUI screen, including an acquisition part, a calculation part and a display control part. The acquisition part acquires measurement data obtained by measuring a swing motion of a golf club by a golfer. The calculation part calculates, based on the measurement data, a first indicator representing a strength with which a wrist cock is held, and a second indicator representing a strength with which the wrist cock is released. The display control part displays, on the GUI screen, the first indicator and the second indicator, as points plotted in a plot plane whose first axis is the strength with which the wrist cock is held and whose second axis is the strength with which the wrist cock is released. The plot plane is divided into shaft weight zones to be recommended to the golfer.

A GUI display device according to a tenth aspect is the GUI display device configured to display a GUI screen and including an acquisition part, a determination part and a display control part. The acquisition part acquires measurement data obtained by measuring a swing motion of a golf club by a golfer. The determination part determines a slope of a head included in the golf club at a time of impact, based on the measurement data. The display control part simultaneously displays, on the GUI screen, a first head graphic, which is a graphic representing the head at the time of impact, and a second head graphic, which is a graphic showing the head at a timing immediately before impact. The first head graphic is displayed so as to incline according to the slope of the head.

According to the first aspect, a first graphic representing the strength with which a wrist cock is held and a second graphic representing the strength with which a wrist cock is released at a plurality of timings during the golf swing are displayed on a GUI screen. Also, the first graphic and the second graphic at the same timing are displayed simultaneously. Accordingly, a user who views such a GUI screen is able to intuitively understand the significance of the movement for holding the wrist cock and the movement for releasing the wrist cock that are carried out during the golf swing. That is, such a GUI screen enables the movement for holding the wrist cock and the movement for releasing the wrist cock that are carried out during the golf swing to be explained visually in an easily understandable manner.

BRIEF DESCRIPTION OF DRAWINGS

FIG. 4A is a diagram showing an address state, FIG. 4B is a diagram showing a top state, FIG. 4C is a diagram showing an impact state, and FIG. 4D is a diagram showing a finish state;

DESCRIPTION OF EMBODIMENTS

Hereinafter, a GUI display device and a program according to one embodiment of the present invention will be described, with reference to the drawings.

1. Schematic Configuration of Fitting System

Figure 1:
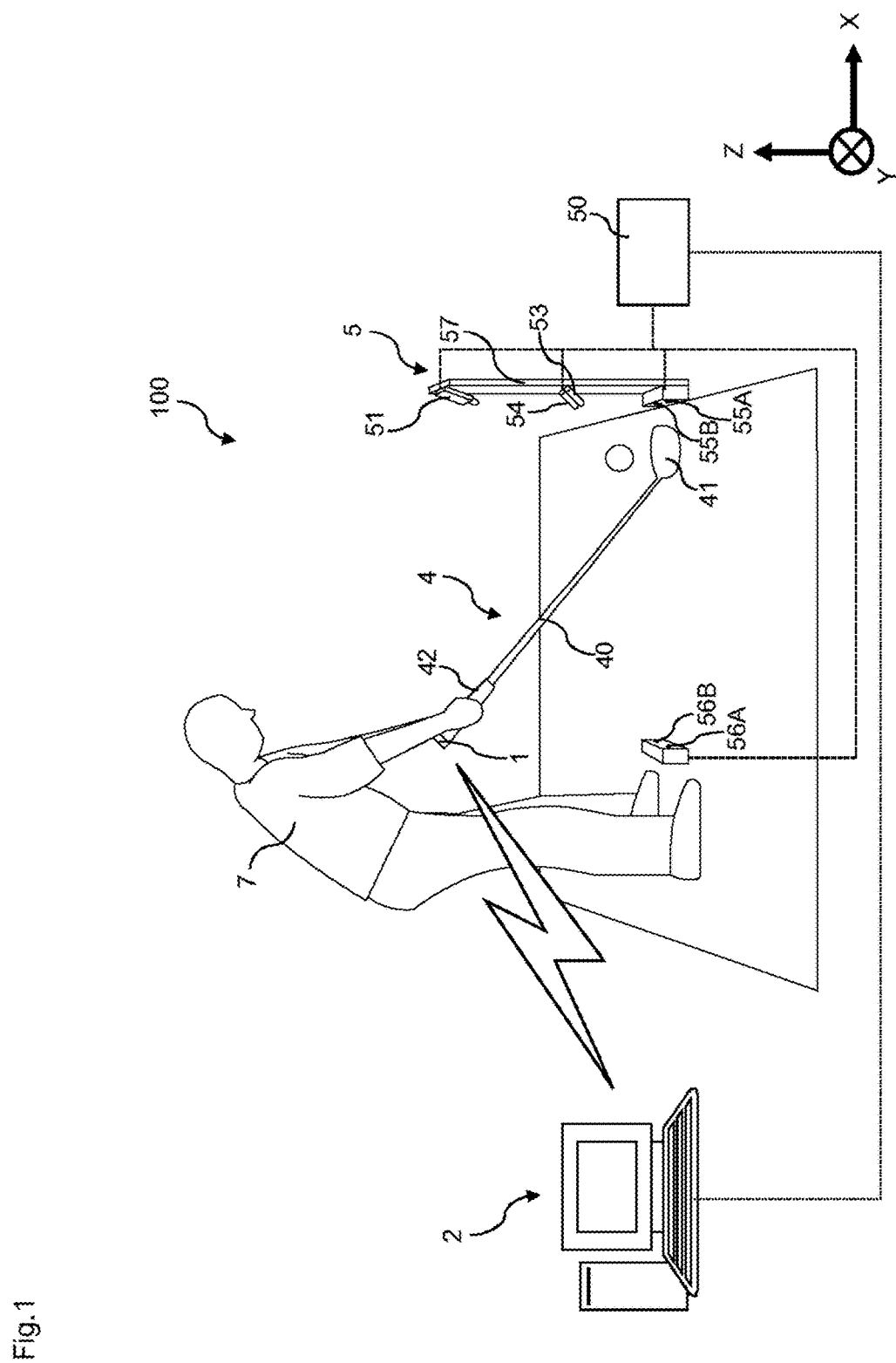
FIG. 1 is a diagram showing a fitting system that is provided with a GUI display device (fitting device) according to one embodiment of the present invention.
Figure 2:
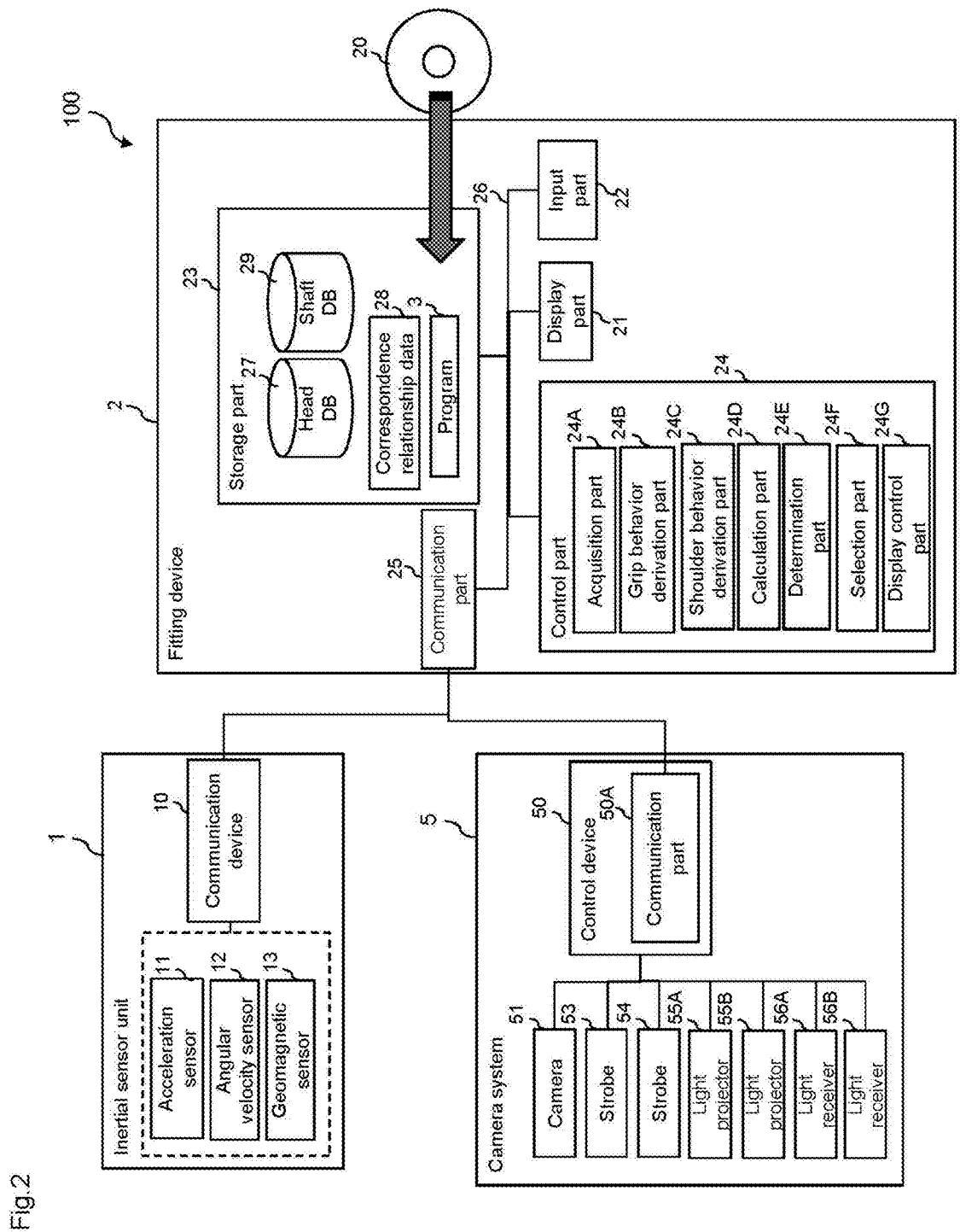
FIG. 2 is a functional block diagram of the fitting system.

FIGS. 1 and 2 show the overall configuration of a fitting system 100 that is provided with a fitting device 2 which is a GUI display device according to the present embodiment. A fitting device 2 is a device for supporting the selection of a golf club 4 suitable for a golfer 7. Thus, the fitting device 2 acquires measurement data obtained by measuring the swing motion of the golf club 4 by the golfer 7, and analyzes the swing motion, based on the measurement data. The analysis results are presented to the user via screens W1 to W5 (FIGS. 19 to 24) or the like which will be discussed later. Note that a user as referred to here is a general term for a person who requires analysis results such as the golfer 7 or his or her instructor. In the present embodiment, the sensor unit configured to measure the swing motion is constituted by an inertial sensor unit 1 and a camera system 5, and the fitting device 2 constitutes the fitting system 100 together with the inertial sensor unit 1 and the camera system 5. Hereinafter, the configurations of the inertial sensor unit 1, the camera system 5 and the fitting device 2 will be described, followed by description of the flow of fitting processing.

1-1. Configuration of Inertial Sensor Unit

Figure 3:
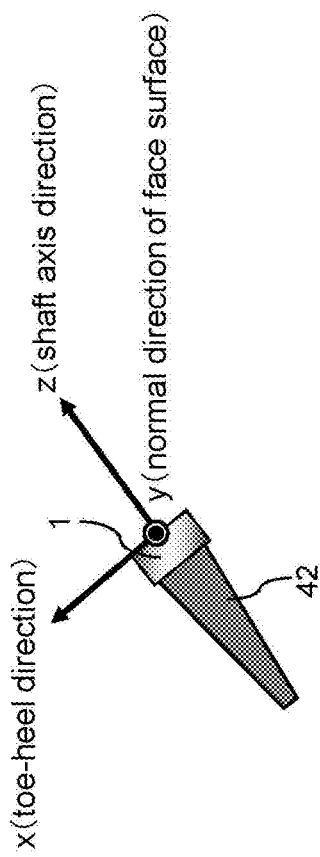
FIG. 3 is a diagram illustrating an xyz local coordinate system that is centered on a grip of a golf club.

The inertial sensor unit 1 is attached to an end portion of a grip 42 of the golf club 4 on the opposite side to a head 41, as shown in FIGS. 1 and 3, and measures the behavior of the grip 42. Note that the golf club 4 is a common golf club, and is constituted by a shaft 40, the head 41 provided at one end of the shaft 40, and the grip 42 provided at the other end of the shaft 40. The shaft according to present embodiment is a carbon shaft. The inertial sensor unit 1 is constituted to be compact and lightweight, so as to not interfere with the swing motion. The inertial sensor unit 1 can be attached to the outer side of the golf club 4, and can be constituted to be freely removed from the golf club 4.

As shown in FIG. 2, the inertial sensor unit 1 according to the present embodiment is equipped with an acceleration sensor 11, an angular velocity sensor 12, and a geomagnetic sensor 13. Also, the inertial sensor unit 1 is also equipped with a communication device 10 for transmitting sensor data (measurement data) that is output from these sensors 11 to 13 to the external fitting device 2. Note that, in the present embodiment, the communication device 10 is a wireless communication device so as to not interfere with the swing motion, but may be configured as a wired communication device that connects to the fitting device 2 via a cable.

The acceleration sensor 11, the angular velocity sensor 12 and the geomagnetic sensor 13 respectively measure grip acceleration, grip angular velocity and grip geomagnetism in an xyz local coordinate system that is centered on the grip 42. More specifically, the acceleration sensor 11 measures grip accelerations $a_x$, $a_y$ and $a_z$ in x-axis, y-axis and z-axis directions. The angular velocity sensor 12 measures grip angular velocities $\omega_x$, $\omega_y$ and $\omega_z$ about the x-axis, y-axis and z-axis. The geomagnetic sensor 13 measures grip geomagnetisms $m_x$, $m_y$ and $m_z$ in the x-axis, y-axis and z-axis directions. The sensor data thereof is acquired as time-series data of a predetermined sampling period $\Delta t$. Note that the xyz local coordinate system is 3-axis orthogonal coordinate system that is defined as shown in FIG. 3. That is, the z-axis coincides with the direction in which the shaft 40 extends, and the direction toward the grip 42 from the head 41 is a z-axis positive direction. The x-axis is oriented so as to be aligned as closely as possible with a toe-heel direction of the head 41, and the y-axis is oriented so as to be aligned as closely as possible with a normal direction of the face surface of the head 41.

In the present embodiment, sensor data from the acceleration sensor 11, the angular velocity sensor 12 and the geomagnetic sensor 13 is transmitted to the fitting device 2 in real time via the communication device 10. However, a configuration may be adopted in which, for example, the sensor data is stored in a memory device within the inertial sensor unit 1, and the sensor data is retrieved from the memory device after the end of the swing motion and delivered to the fitting device 2.

1-2. Configuration of Camera System

Next, the configuration of the camera system 5 will be described. The camera system 5 is provided with a camera 51 and a plurality of strobes 53 and 54, and performs strobe-type shooting. The camera 51 is fixed to a support stand 57 in front of the golfer 7, and is disposed diagonally above the position of the ball at the time of address, so as to be able to shoot a crown part 41b (see FIG. 18) of the head 41 of the golf club 4 from above. The strobes 53 and 54 are also fixed to the support stand 57, and are disposed above the ground and below the camera 51.

Note that the swing motion of a golf club generally progresses in order of address, top, impact and finish. Address indicates an initial state in which the head 41 of the golf club 4 is disposed near the ball, as shown in FIG. 4A, and top indicates a state in which the golf club 4 is taken back from address and the head 41 is swung up to the highest point, as shown in FIG. 4B. Impact indicates a state at the moment in which the golf club 4 is swung down from top (downswing) and the head 41 strikes the ball, as shown in FIG. 4C, and finish indicates a state in which the golf club 4 is swung through to the front after impact, as shown in FIG. 4D.

Also, the camera system 5 is provided with light projectors 55A and 55B and light receivers 56A and 56B, with the light projector 55A and the light receiver 56A constituting one timing sensor, and the light projector 55B and the light receiver 56B constituting another timing sensor. The times that are generated by these timing sensors, as described below, are used in determining the timing for performing light emission of the strobes 53 and 54 and shooting with the camera 51 thereafter, as well as being used in calculating a head speed $V_{hi}$ immediately before impact (can be regarded as the time of impact).

Furthermore, the camera system 5 is provided with a control device 50 for controlling the operations of the above devices 51 and 53 to 56B. The control device 50 is provided with a communication part 50A (see FIG. 2) in addition to a CPU, a ROM, a RAM, and the like, and the communication part 50A is connected to the above devices 51, 53 to 56B. The communication part 50A is connected also to a communication part 25 (see FIG. 2) of the fitting device 2.

The light projectors 55A and 55B are disposed under the camera 51, in a vicinity of the ground in front of the golfer 7. On the other hand, the light receivers 56A and 56B are disposed in a vicinity of the toes of the golfer 7. The light projector 55A and the light receiver 56A are disposed on a straight line roughly parallel to the X-axis, and face each other (see FIG. 1). The same also applies to the light projector 55B and the light receiver 56B. The light projectors 55A and 55B constantly irradiate light respectively toward the light receivers 56A and 56B during golf swing, and the light receivers 56A and 56B are receive this light. However, at the timing at which the golf club 4 passes between the light projectors 55A and 55B and the light receivers 56A and 56B, the light from the light projectors 55A and 55B is blocked by the golf club 4, preventing the light receivers 56A and 56B from receiving this light. The light receivers 56A and 56B detect this timing, and, in response, the control device 50 respectively generates timings t1 and t2.

At timing t3 after this timing t1, the control device 50 instructs the strobe 53 to emit light, and instructs the camera 51 to shoot an image. Also, at timing t4 after timing t2, the control device 50 instructs the strobe 54 to emit light, and instructs the camera 51 to shoot an image. The image data (measurement data) shot by the camera 51 is transmitted to the control device 50, and further transmitted to the fitting device 2 from the control device 50. The control device 50 also transmits information (measurement data) of timings t1 and t2 to the fitting device 2.

1-3. Configuration of Fitting Device

The configuration of the fitting device 2 will be described, with reference to FIG. 2. The fitting device 2 is manufactured by installing a program 3 stored in a computer-readable recording medium 20 such as a CD-ROM or a USB memory in a general-purpose personal computer from the recording medium 20. The program 3 is software for analyzing the swing motion based on the measurement data sent from the sensor units 1 and 5, and displaying results of the analysis. The program 3 causes the fitting device 2 to execute operations that will be discussed later.

The fitting device 2 is provided with a display part 21, an input part 22, a storage part 23, a control part 24, and the communication part 25. These parts 21 to 25 are connected via a bus line 26, and can communicate with each other. In the present embodiment, the display part 21 is constituted by a liquid crystal display or the like, and displays information that will be discussed later to the user. Also, the input part 22 can be constituted by a mouse, a keyboard, a touch panel, and the like, and accepts operations to the fitting device 2 from the user. The communication part 25 is a communication interface that enables communication between the fitting device 2 and an external device, and receives measurement data from the sensor units 1 and 5.

The storage part 23 is constituted by a non-volatile storage device such as a hard disk. The measurement data sent from the sensor units 1 and 5 is saved to the storage part 23, in addition to the program 3 being stored therein. Also, correspondence relationship data 28, a head database (DB) 27 and a shaft database (DB) 29 are stored in the storage part 23. The head DB 27 is a database in which information indicating the specifications of a large number of heads 41 is stored in association with information specifying the types of head 41. The shaft DB 29 is a database in which information indicating the specifications of a large number of shafts 40 is stored in association with information specifying the types of shaft 40. The correspondence relationship data 28 will be discussed later.

The control part 24 can be constituted by a CPU, a ROM, a RAM, and the like. The control part 24, by reading out and executing the program 3 stored in the storage part 23, operates in a virtual manner as an acquisition part 24A, a grip behavior derivation part 24B, a shoulder behavior derivation part 24C, a calculation part 24D, a determination part 24E, a selection part 24F, and a display control part 24G. The operations of each of the parts 24A to 24G will be discussed in detail later.

2. Fitting Processing

Figure 5:
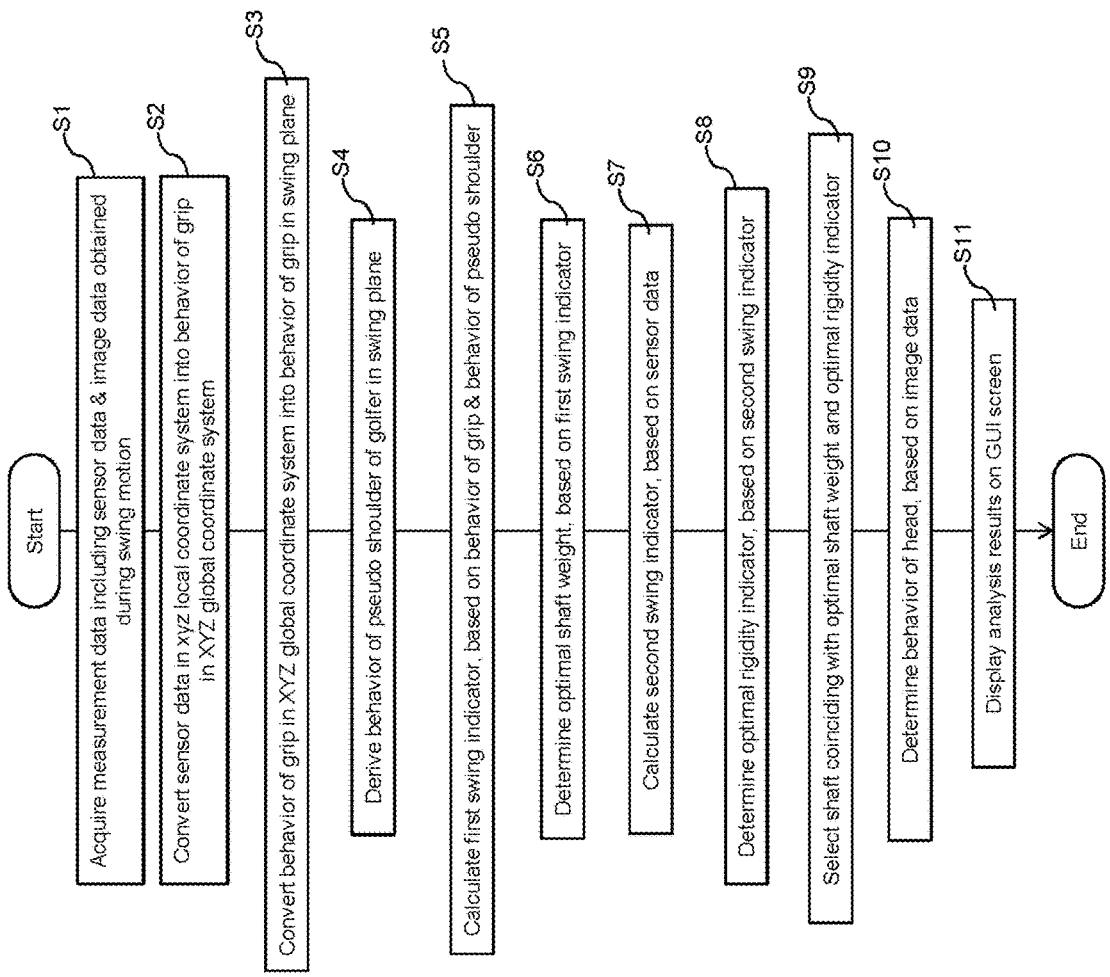
FIG. 5 is a flowchart showing the flow of fitting processing.

Next, fitting processing that is executed by the fitting system 100 will be described. The fitting processing according to the present embodiment is constituted by the following eleven processes (S1 to S11), as shown in FIG. 5.

(S1) A measurement process for measuring the swing motion by the golfer 7 using the inertial sensor unit 1 and the camera system 5.

(S2) A first conversion process for converting the sensor data of the grip accelerations $a_x$, $a_y$ and $a_z$, the grip angular velocities $\omega_x$, $\omega_y$ and $\omega_z$ and the grip geomagnetisms $m_x$, $m_y$ and $m_z$ in the xyz local coordinate system acquired in the measurement process into grip accelerations $a_X$, $a_Y$ and $a_Z$, grip angular velocities $\omega_X$, $\omega_Y$ and $\omega_Z$ and in an XYZ global coordinate system.

(S3) A second conversion process for converting the behavior of the grip 42 in the XYZ global coordinate system into the behavior of the grip 42 in a swing plane P (discussed later).

(S4) A shoulder behavior derivation process for deriving the behavior of a pseudo shoulder of the golfer 7 in the swing plane P, based on the behavior of the grip 42 in the swing plane P.

(S5) A first indicator calculation process for calculating an arm output power $P_{1\_AVE}$ and a club input power $P_{2\_AVE}$ (hereinafter, these may be collectively referred to as a first swing indicator) which will be discussed later, based on the behavior of the grip 42 and the behavior of the pseudo shoulder in the swing plane P.

(S6) An optimal shaft weight determination process for determining an optimal shaft weight, which is the weight of the shaft 40 suitable for the golfer 7, based on the first swing indicator.

(S7) A second indicator calculation process for calculating a second swing indicator (in the present embodiment, first to fourth feature amounts $F_1$ to $F_4$ which will be discussed later), based on the sensor data.

(S8) An optimal rigidity determination process for determining an optimal rigidity indicator indicating the rigidity (in the present embodiment, IFC and flex which will be discussed later) of the shaft 40 suitable for the golfer 7, based on the second swing indicator.

(S9) A recommended shaft selection process for selecting the shaft 40 coinciding with the optimal shaft weight and the optimal rigidity indicator.

(S10) A head behavior determination process for determining the behavior of the head 41, based on image data (measurement data) obtained in the measurement process.

(S11) A result display process for displaying analysis results on GUI screens.

Hereinafter, these processes will be described in order. Note that the XYZ global coordinate system is 3-axis orthogonal coordinate system defined as shown in FIG. 1. That is, the Z-axis is a direction upward from perpendicularly downward, the X-axis is a direction toward the stomach of the golfer 7 from his or her back, and the Y-axis is a direction toward a target point from a ball hitting point in parallel with a horizontal plane.

2-1. Measurement Process

In the measurement process (S1), the golf club 4 with the abovementioned inertial sensor unit 1 attached is swung by the golfer 7. Hereinafter, the golf club 4 that is used in the measurement process may be called a test club. The sensor data of the grip accelerations $a_x$, $a_y$ and $a_z$, the grip angular velocities $\omega_x$, $\omega_y$ and $\omega_z$ and the grip geomagnetisms $m_x$, $m_y$ and $m_z$ during the swing motion of the test club is measured by the inertial sensor unit 1. This sensor data is transmitted to the fitting device 2 via the communication device 10 of the inertial sensor unit 1. On the other hand, on the fitting device 2 side, the acquisition part 24A receives this data via the communication part 25, and stores the received data in the storage part 23. In the present embodiment, time-series sensor data at least from address to impact is measured.

Also, in the measurement process, light emission processing by the strobes 53 and 54 and shoot processing by the camera 51 are performed on the basis of the times t1 and t2 that are generated by the abovementioned timing sensor, during the swing motion of the test club. Image data portraying the situation in proximity to the head 41 in a vicinity of impact during the swing motion is shot, and information at the timings t1 and t2 is measured, then these measurement data are transmitted to the fitting device 2 via the communication part 50A. On the other hand, on the fitting device 2 side, the acquisition part 24A receives this data via the communication part 25, and stores the received data in the storage part 23.

In the measurement process, it is preferable that the test club is swung a plurality of times, and preferably two to five times. In this case, the average value of the various values that are calculated based on the measurement data can be calculated, and variation in the analysis results can be reduced by using this average value in subsequent calculations.

2-2. First Conversion Process

In the first conversion process (S2), the sensor data of the xyz local coordinate system is converted into values of the XYZ global coordinate system. Specifically, the grip behavior derivation part 24B reads out the time-series sensor data of the grip accelerations $a_x$, $a_y$ and $a_z$, the grip angular velocities $\omega_x$, $\omega_y$ and $\omega_z$ and the grip geomagnetisms $m_x$, $m_y$ and $m_z$ in the xyz local coordinate system from address to impact that is stored in the storage part 23. The grip behavior derivation part 24B then converts the time-series data of the grip accelerations $a_x$, $a_y$ and $a_z$ and the grip angular velocities $\omega_x$, $\omega_y$ and $\omega_z$ in the xyz local coordinate system from address to impact into time-series data in the XYZ global coordinate system from address to impact, based on the read sensor data. Hereinafter, the grip accelerations and the grip angular velocities in the XYZ global coordinate system after conversion will be referred to as grip accelerations $a_X$, $a_Y$ and $a_Z$ and grip angular velocities $\omega_X$, $\omega_Y$ and $\omega_Z$. Also, in the first conversion process, the grip behavior derivation part 24B derives grip speeds $v_X$, $v_Y$ and $v_Z$ in the XYZ global coordinate system from address to impact, by integrating the time-series data of the grip accelerations $a_X$, $a_Y$ and $a_Z$. Note that various methods of converting values from a local coordinate system to a global coordinate system are known. Accordingly, although detailed description is omitted here, processing can, if necessary, be performed in accordance with methods described in JP 2016-2429A, JP 2016-2430A, and the like disclosed by the applicants of the present invention.

2-3. Second Conversion Process

Figure 6:
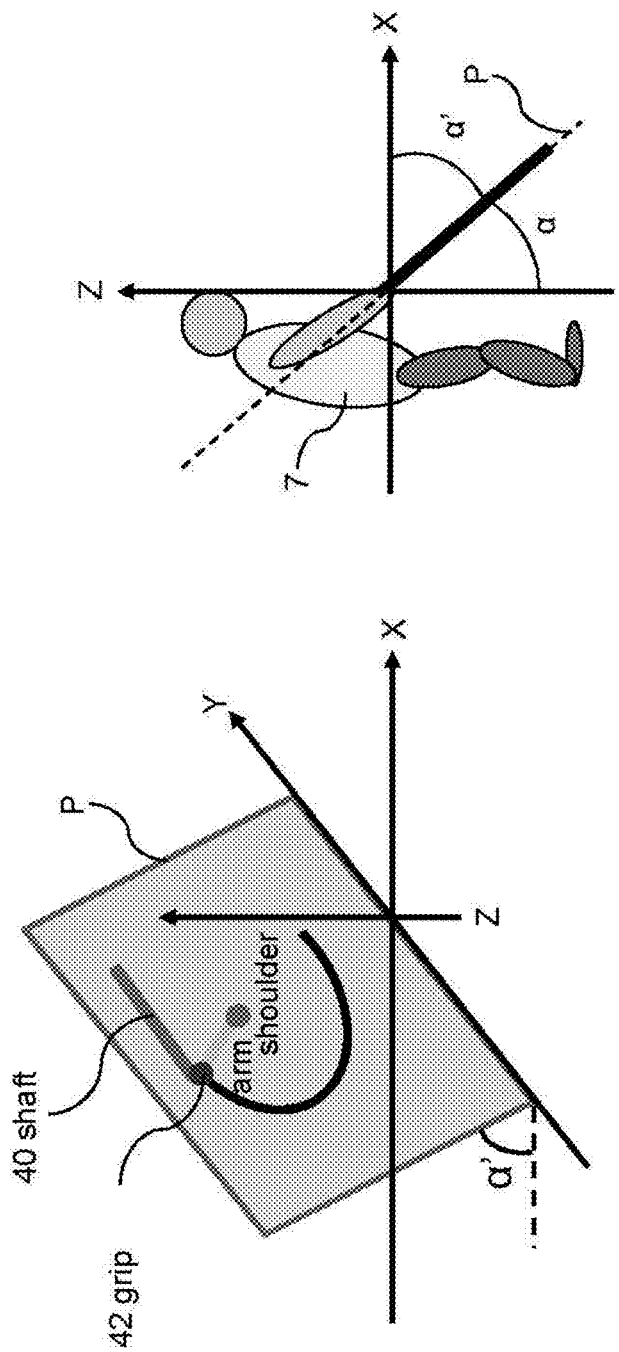
FIG. 6 is a diagram illustrating a swing plane.

In the second conversion process (S3), the grip behavior derivation part 24B converts the behavior of the grip 42 in the XYZ global coordinate system calculated in the first conversion process into the behavior of the grip 42 in the swing plane P. In the present embodiment, the swing plane P is defined as a plane containing the origin of the XYZ global coordinate system and parallel to the Y-axis and the shaft 40 at the time of impact (see FIG. 6). The grip behavior derivation part 24B calculates a grip speed ($v_{pY}$, $v_{pZ}$) obtained by projecting the grip speeds $v_X$, $v_Y$ and $v_Z$ in the XYZ global coordinate system from address to impact onto the swing plane P, and calculates a grip speed $V_{GE}$ (scalar) in the swing plane P from address to impact is calculated, in accordance with the following equation.

$$V_{GE} = \sqrt{(v_{pY})^2 + (v_{pZ})^2} \qquad \text{Equation 1}$$

Also, the grip behavior derivation part 24B calculates the trajectory of the grip 42 in the swing plane P, by integrating the grip speed ($v_{pY}$, $v_{pZ}$). Furthermore, the grip behavior derivation part 24B calculates a grip angular velocity $\omega_{pX}$ about an axis orthogonal to the swing plane P. Note that the specific calculation method of the second conversion process can be selected as appropriate, and processing can, if necessary, be performed in accordance with methods described in JP 2016-2429A, JP 2016-2430A and the like disclosed by the applicants.

2-4. Shoulder Behavior Derivation Process

Hereinafter, the shoulder behavior derivation process (S4) of deriving the behavior of the pseudo shoulder in the swing plane P based on the behavior of a grip in the swing plane P will be described. In the present embodiment, the behavior of the golf club 4 is analyzed based on a double pendulum model (see FIG. 7) in which the shoulder of the golfer 7 and the grip 42 (or the wrist of the golfer who holding the grip) serve as a node, and the arm of the golfer 7 and the golf club 4 serve as a link. The behavior of the shoulder is, however, derived as the behavior of a pseudo shoulder based on the measured behavior of the grip, rather than being measured directly. Hereinafter, unless specifically stated otherwise, reference simply to the "shoulder" can be intended to mean such a pseudo shoulder. The same applies to a pseudo "arm" that is defined as extending linearly between the pseudo shoulder and the grip 42 (wrist).

Figure 7:
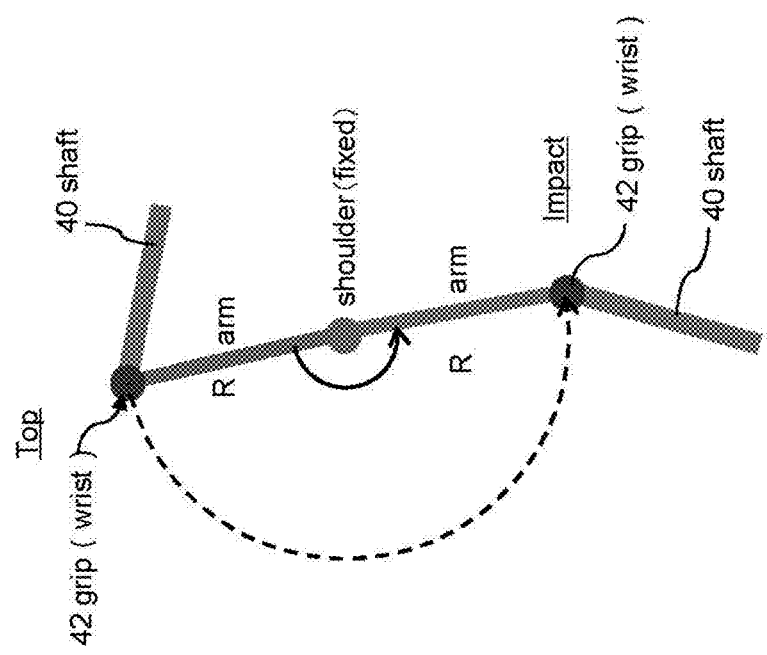
FIG. 7 is a diagram schematically illustrating a double pendulum model.

In specifying the behavior of the shoulder from the behavior of the grip, the double pendulum model according to the present embodiment is premised on the following (1) to (3). FIG. 7 is a diagram conceptually illustrating the following preconditions.

(1) In the swing plane P, the grip 42 moves circularly about the shoulder.
(2) In the swing plane P, a distance (radius) R between the shoulder and the grip 42 is constant.
(3) The shoulder does not move during the swing motion (the shoulder does rotate, however).

Figure 8:
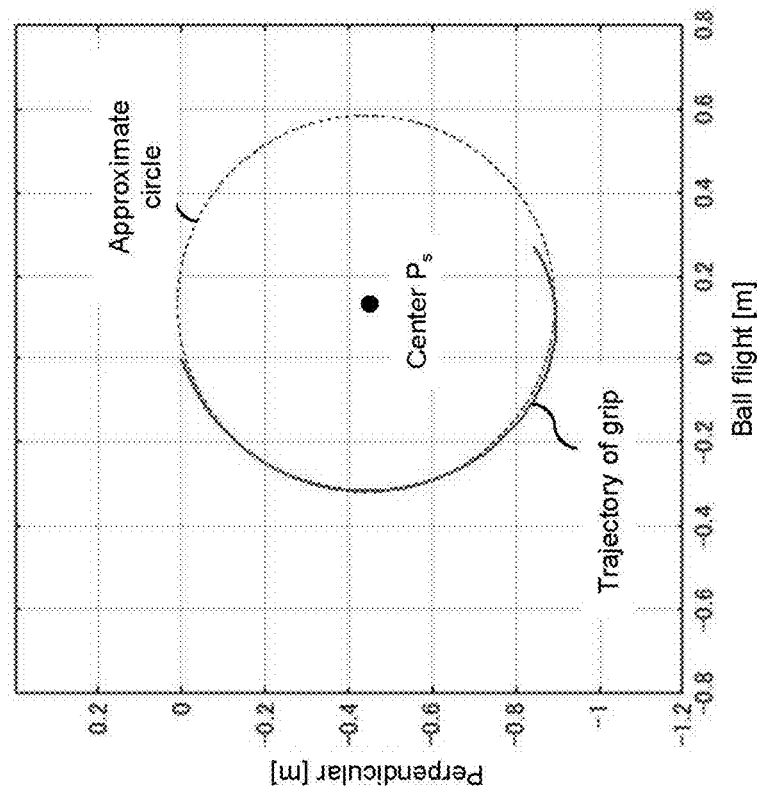
FIG. 8 is a diagram schematically illustrating a shoulder behavior derivation process.

Under the above premise, the shoulder behavior derivation part 24C approximates the trajectory of the grip 42 in the swing plane P obtained in the second conversion process to a circular arc (circle) (see FIG. 8). The shoulder behavior derivation part 24C then sets the center of the circular arc (circle) to a position $P_s = (P_{sX}, P_{sY})$ of the shoulder, and the average distance from the center of the circular arc (circle) to the trajectory of the grip 42 to an arm length (distance between the shoulder and grip 42) R. Hereinafter, the coordinates of point $A_i$ on the trajectory of the grip 42 are represented as $(X_i, Y_i)$ (i=1, 2, ...). Note that i as referred to here is a data number in time sequence.

Figure 9:
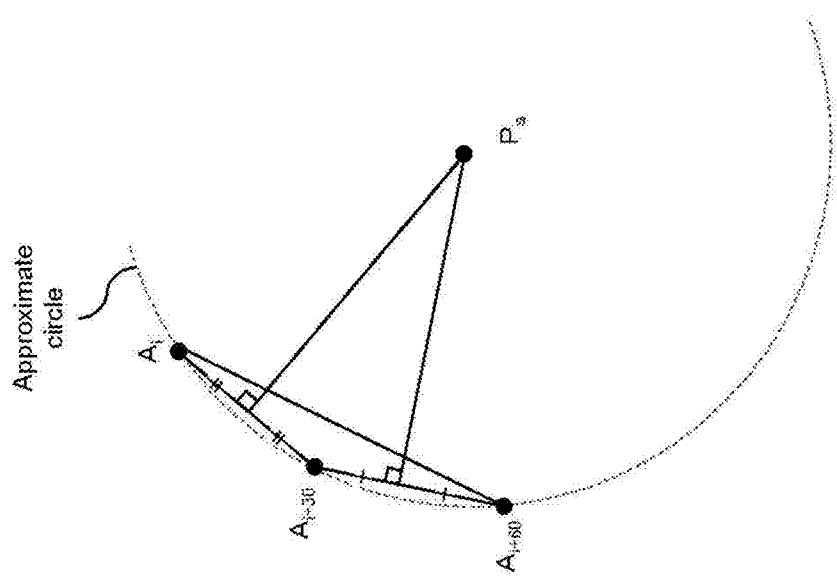
FIG. 9 is another diagram schematically illustrating the shoulder behavior derivation process.

Hereinafter, an example of a method of deriving the approximate circular arc (circle) of the trajectory of the grip 42 will be shown. First, three arbitrary points on the trajectory of the grip 42, such as $A_i$, $A_{i+30}$ and $A_{i+60}$, for example, will be considered. At this time, given that the center of a circle that circumscribes an arbitrary triangle d will be the intersection of perpendicular bisectors of the three sides of the triangle, the following equation 2 and, by extension, equation 3 hold, when a triangle whose vertices are $A_i$, $A_{i+30}$ and $A_{i+60}$ is considered (see FIG. 9).

$$(A_{i+60} - A_{i+30}) \cdot (P_s - A_{i+30} + A_{i+60}/2) = 0$$

$$(A_i - A_{i+30}) \cdot (P_s - A_i + A_{i+30}/2) = 0 \qquad \text{Equation 2}$$

$$\text{Equation 3}$$

$$\begin{bmatrix} X_{i+60} - X_{i+30} & Y_{i+60} - Y_{i+30} \\ X_i - X_{i+30} & Y_i - Y_{i+30} \end{bmatrix} \begin{Bmatrix} P_{sX} \\ P_{sY} \end{Bmatrix} =$$

$$\begin{Bmatrix} (X_{i+60} - X_{i+30})(X_{i+60} + X_{i+30})/2 + (Y_{i+60} - Y_{i+30})(Y_{i+60} + Y_{i+30})/2 \\ (X_i - X_{i+30})(X_i + X_{i+30})/2 + (Y_i - Y_{i+30})(Y_i + Y_{i+30})/2 \end{Bmatrix}$$

The shoulder behavior derivation part 24C then creates the following equation 4 from a plurality of equation 3 with respect to various values of i, and derives a pseudo inverse matrix. A center $P_s = (P_{sX}, P_{sY})$ of the approximate circle (circular arc) of the trajectory of the grip 42 can thereby be derived.

$$\text{Equation 4}$$

$$\begin{bmatrix} X_{i+60} - X_{i+30} & Y_{i+60} - Y_{i+30} \\ X_i - X_{i+30} & Y_i - Y_{i+30} \\ \vdots & \vdots \end{bmatrix} \begin{Bmatrix} P_{sX} \\ P_{sY} \end{Bmatrix} =$$

$$\begin{Bmatrix} (X_{i+60} - X_{i+30})(X_{i+60} + X_{i+30})/2 + (Y_{i+60} - Y_{i+30})(Y_{i+60} + Y_{i+30})/2 \\ (X_i - X_{i+30})(X_i + X_{i+30})/2 + (Y_i - Y_{i+30})(Y_i + Y_{i+30})/2 \\ \vdots \end{Bmatrix}$$

Next, the shoulder behavior derivation part 24C calculates the average value of the distance from the center $P_s = (P_{sX}, P_{sY})$ of the approximate circle (circular arc) to each point $A_i = (X_i, Y_i)$ on the trajectory of the grip 42, and sets the calculated average value to an arm length R. The shoulder behavior derivation part 24C then calculates an angular velocity (angular velocity of arm) $\omega_1 = V_{GE}/R$ about the shoulder from top to impact in the swing plane P, based on this arm length R. That is, an angular velocity $\omega_1$ of the arm will be a value that reflects the grip speed $V_{GE}$ obtained through measurement.

2-5. First Indicator Calculation Process

Figure 10:
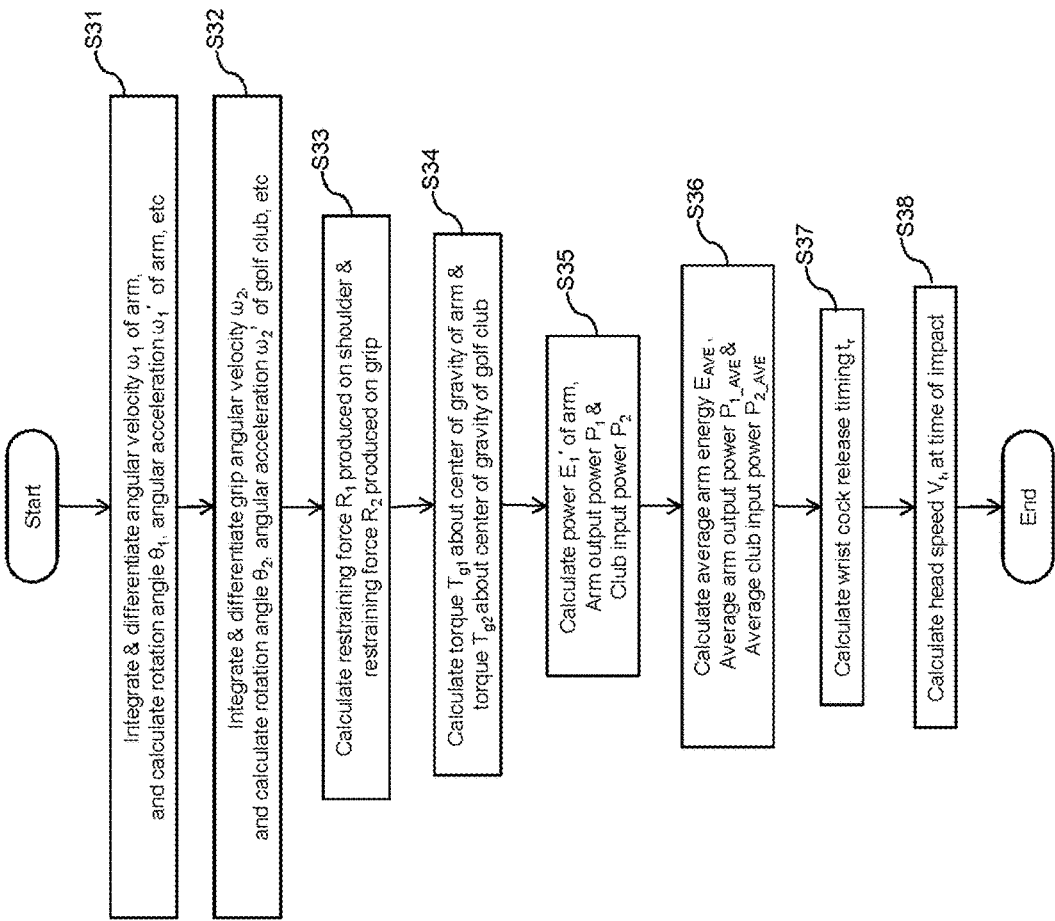
FIG. 10 is a flowchart showing the flow of a first indicator calculation process.

Hereinafter, the first indicator calculation process (S5) of calculating the first swing indicator, based on the behavior of the grip 42 and the behavior of the shoulder, will be described, with reference to FIG. 10. The first swing indicator is an indicator for determining the optimal shaft weight, and is a feature amount that characterizes the swing motion by the golfer 7. The first swing indicator of the present embodiment is the arm output power $P_{1\_AVE}$ and the club input power $P_{2\_AVE}$ which will be discussed later.

Figure 11:
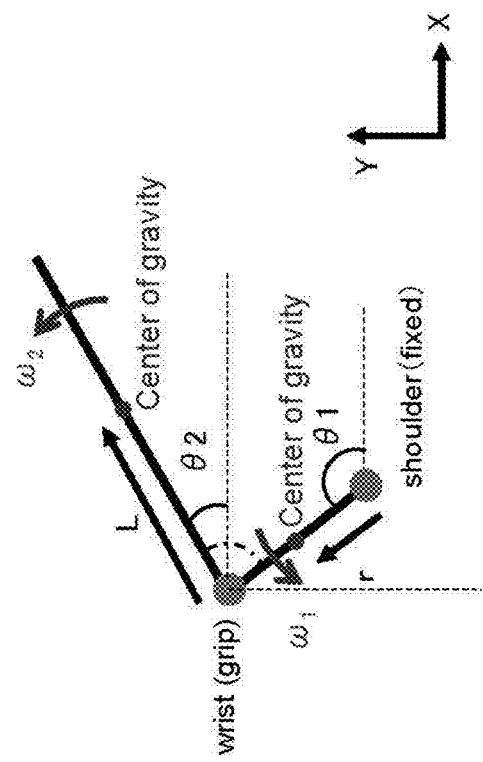
FIG. 11 is another diagram schematically illustrating a double pendulum model.

Specifically, first, in step S31, the shoulder behavior derivation part 24C integrates the angular velocity $\omega_1$ of the arm from top to impact, and calculates a rotation angle $\theta_1$ of the arm from top to impact. Note that the rotation angle $\theta_1$ is defined as shown in FIG. 11, and the paper surface shown in FIG. 11 is equal to the swing plane P. Hereinafter, analysis proceeds, based on a new XY coordinate system contained in the swing plane P shown in FIG. 11. The X-axis of the new XY coordinate system contained in the swing plane P is equal to the Y-axis of the abovementioned XYZ global coordinate system, and the Y-axis of the new XY coordinate system is an axis obtained by projecting the Z-axis of the XYZ global coordinate system onto the swing plane P.

Also, the shoulder behavior derivation part 24C differentiates the angular velocity $\omega_1$ of the arm from top to impact, and calculates an angular acceleration $\omega_1'$ from top to impact. Next, the shoulder behavior derivation part 24C calculates a position $(X_1, Y_1)$, a speed $(V_{X1}, V_{Y1})$ and an acceleration $(A_{X1}, A_{Y1})$ of the center of gravity of the arm from top to impact. These values are calculated by substituting the abovementioned calculation result into the following equation.

$$X_1 = r \cos \theta_1$$

$$Y_1 = r \sin \theta_1$$

$$V_{X1} = -r\omega_1 \sin \theta_1$$

$$V_{Y1} = r\omega_1 \cos \theta_1$$

$$A_{X1} = -r\omega_1' \sin \theta_1 - r\omega_1^2 \cos \theta_1$$

$$A_{Y1} = r\omega_1' \cos \theta_1 - r\omega_1^2 \sin \theta_1 \qquad \text{Equation 5}$$

Here, r is the distance from the shoulder to the center of gravity of the arm. In the present embodiment, the center of gravity of the arm is assumed to be in the center of the arm. Accordingly, R=2r.

Next, in step S32, the grip behavior derivation part 24B performs a similar operation to step S31 with regard to about the grip 42. That is, the grip behavior derivation part 24B integrates a grip angular velocity $\omega_{px}$ from top to impact=an angular velocity $\omega_2$ of the golf club 4 about the grip 42, and calculates a rotation angle $\theta_2$ of the golf club 4 (shaft 40) about the grip 42 from top to impact. A rotation angle $\theta_2$ is defined as shown in FIG. 11.

Next, the grip behavior derivation part 24B differentiates the angular velocity $\omega_2$ of the golf club 4 from top to impact, and calculates an angular acceleration $\omega_2'$ from top to impact. Next, the grip behavior derivation part 24B calculates a position $(X_2, Y_2)$, a speed $(V_{X2}, V_{Y2})$ and an acceleration $(A_{X2}, A_{Y2})$ of the center of gravity of the golf club 4 from top to impact. These values are calculated by substituting the abovementioned calculation result into the following equation.

$$X_2 = 2X_1 + L \cos \theta_2$$

$$Y_2 = 2Y_1 + L \sin \theta_2$$

$$V_{X2} = 2V_{X1} - L\omega_2 \sin \theta_2$$

$$A_{X2} = 2A_{X1} - L\omega_2' \sin \theta_2 - L\omega_2^2 \cos \theta_2$$

$$A_{Y2} = 2A_{Y1} - L\omega_2' \cos \theta_2 - L\omega_2^2 \sin \theta_2 \qquad \text{Equation 6}$$

Here, L is the distance from the grip 42 to the center of gravity of the golf club 4. The value of L is a specification of the golf club 4, and is assumed to be determined in advance.

Next, in step S33, the calculation part 24D calculates a restraining force $R_1 = (R_{X1}, R_{Y1})$ that is produced on the shoulder from top to impact, by substituting the abovementioned calculation result into the following equation, and calculates a restraining force $R_2 = (R_{X2}, R_{Y2})$ that is produced on the grip 42 from top to impact. The following equation is based on balancing forces in the translation direction. Here, $m_1$ is the mass of the arm, and, in the present embodiment, it is assumed that the mass $m_1$ of the arm is determined in advance as appropriate. For example, the weight of the golfer 7 is input before starting analysis, and the mass of the arm is automatically calculated, by multiplying the input weight by a predetermined coefficient or the like. $m_2$ is the mass of the golf club 4, and g is the gravitational acceleration. Also, $m_2$ is a specification of the golf club 4, and is assumed to be determined in advance.

$$R_{X1} = R_{X2} - m_1 \cdot A_{X1}$$

$$R_{Y1} = R_{Y2} - m_1 \cdot A_{Y1} - m_1 \cdot g \cdot \sin \alpha$$

$$R_{X2} = -m_2 \cdot A_{X2}$$

$$R_{Y2} = -m_2 \cdot A_{Y2} - m_2 \cdot g \cdot \sin \alpha \qquad \text{Equation 7}$$

In the following step S34, the calculation part 24D calculates a torque $T_{g1}$ about the center of gravity of the arm from top to impact and a torque $T_{g2}$ about the center of gravity of the golf club 4, by substituting the abovementioned calculation result into the following equation.

$$T_{g1} = I_1 \cdot \omega 1' + r \cdot \sin \theta_1 \cdot R_{X1} - r \cdot \cos \theta_1 \cdot R_{Y1} + r \cdot \sin \theta_1 \cdot R_{X2} - r \cdot \cos \theta_1 \cdot R_{Y2}$$

$$T_{g2} = I_2 \cdot \omega 2' + L \cdot \sin \theta_2 \cdot R_{X2} - L \cdot \cos \theta_2 \cdot R_{Y2} \qquad \text{Equation 8}$$

Here, $I_1$ is the moment of inertia about the center of gravity of the arm, and $I_2$ is the moment of inertia about the center of gravity of the golf club 4. In the present embodiment, the moment of inertia about the center of gravity of the arm is calculated as $I_1 = m_1 r^2 / 3$, under the assumption that the center of gravity of the arm is in the center of the arm. Also, $I_2$ is a specification of the golf club 4 and is determined in advance.

In the following step S35, the calculation part 24D calculates power $E_1'$ of the arm from top to impact, based on the abovementioned calculation result. Specifically, $E_1'$ is represented in accordance with the following equation, where $v_s$ is the velocity vector of the shoulder, and $v_g$ is the velocity vector of the grip 42. Also, $v_s$ and $v_g$ can be respectively computed by performing first-order differentiation on the position vector $d_s$ of the shoulder and the position vector $d_g$ of the grip $42 = d_s + (2X_1, 2Y_1)$.

$$E_1' = -R_1 v_s^T + R_2 v_g^T + T_{g1} \omega_1 - T_{g2} \omega_1 \qquad \text{Equation 9}$$

Also, in the present embodiment, since the shoulder do not move, $v_s = (0, 0)$, and the power $E_1'$ of the arm is calculated in accordance with the following equation. The calculation part 24D calculates the power $E_1'$ of the arm from top to impact, by substituting the abovementioned calculation result into the following equation.

$$E_1' = R_2 v_g^T + T_{g1} \omega_1 - T_{g2} \omega_1 \qquad \text{Equation 10}$$

Incidentally, in a golf swing, in order to maximize the acceleration of the tip (head 41) of the golf club 4, it is considered desirable to sufficiently accelerate the arm first and, thereafter, to stop the movement of the arm and provide force to the golf club 4. The state of acceleration of the arm as referred to here can be replaced with a physical indicator such as a power (arm output power) $P_1$ that the arm outputs, and the force that is provided to the golf club 4 can be replaced with a physical indicator such as a power (club input power) $P_2$ that is input to the golf club 4. The arm output power $P_1$ corresponds to the second term and third term portions of the right side of equation 10 that represents the power $E_1'$ of the arm. Also, the club input power $P_2$ corresponds to the first term portion of the right side in equation 10. That is, the arm output power $P_1$ and the club input power $P_2$ can be represented as follows. In step S35, the calculation part 24D calculates the arm output power $P_1$ and the club input power $P_2$ from top to impact, in addition to the power $E_1'$ of the arm.

$$P_1 = T_{g1}\omega_1 - T_{g2}\omega_1$$

$$P_2 = R_2 v_g^T \qquad \text{Equation 11}$$

Note that a power $E_2'$ that is exhibited by the golf club 4 during the swing motion can be represented as in the following equation. That is, energy is transmitted to the golf club 4 from the arm, through the mediation of the club input power $P_2 = R_2 v_g^T$.

$$E_2' = -R_2 v_g^T + T_{g2}\omega_2 \qquad \text{Equation 12}$$

Figure 12:
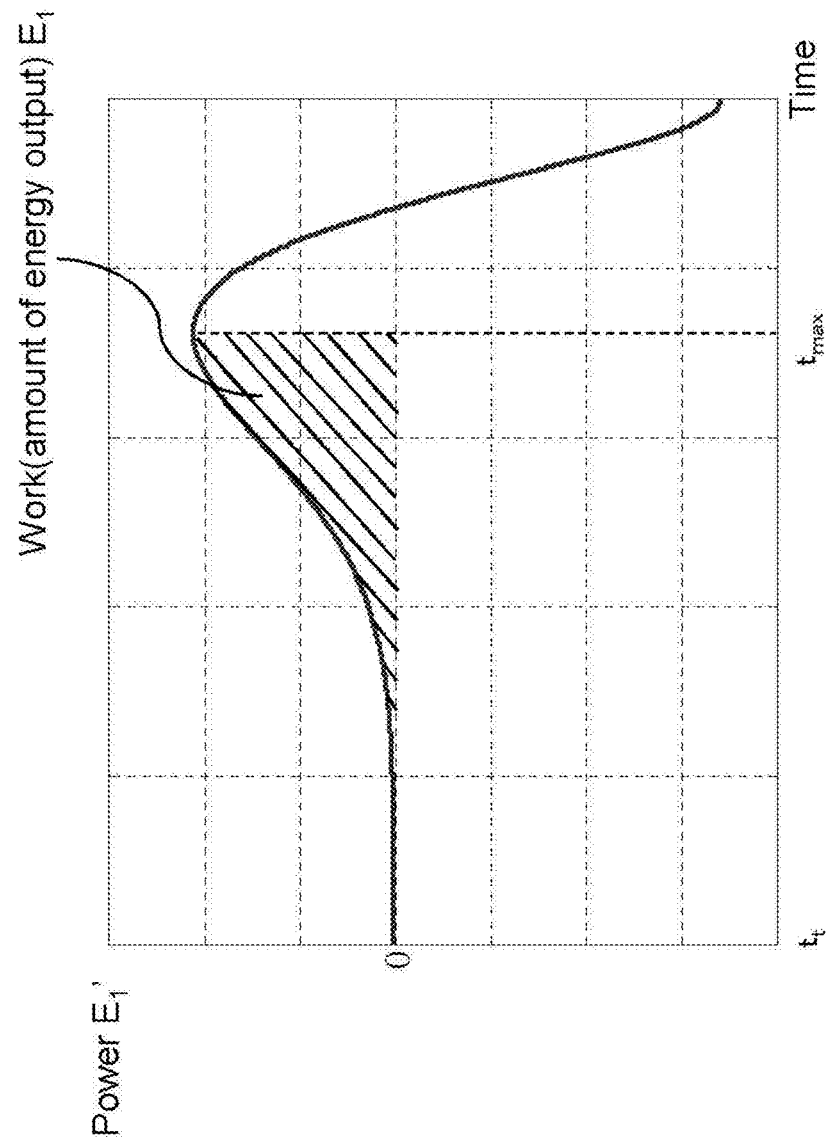
FIG. 12 is a diagram illustrating arm energy.

In the following step S36, the calculation part 24D calculates the work $E_1$ of the arm from time $t_t$ of top to time $t_{max}$ at which the power $E_1'$ is maximized. A work $E_1$ of the arm is calculated, by integrating the power $E_1'$ of the arm in the interval from time $t_t$ to time $t_{max}$ (see FIG. 12). Note that the work $E_1$ can be considered to be an indicator representing the work (energy) that is exhibited by the arm during times $t_t$ to $t_{max}$, and, in this sense, can be referred to as arm energy during the swing motion. Also, the calculation part 24D calculates an average power $E_{AVE} = E_1/t_{max} - t_t$ that is exhibited by the arm during times $t_t$ to $t_{max}$. The average power $E_{AVE}$ is the arm energy exhibited or consumed on average per unit time during the swing motion.

Also, the calculation part 24D integrates the arm output power $P_1$ in the interval from time $t_t$ of top to time $t_m$ at which the arm output power $P_1$ takes a maximum value, and calculates the average arm output power $P_{1\_AVE}$ during the swing motion, by dividing this integral value $D_1$ by this integration interval. Note that this integral value $D_1$ is the work that the arm of the golfer performs during the swing motion, and can serve as an indicator representing the arm output power. Similarly, the calculation part 24D integrates the club input power $P_2$ in the interval from time $t_t$ of top to time $t_n$ at which the club input power $P_2$ takes a maximum value, and calculates the average club input power $P_{2\_AVE}$ during the swing motion, by dividing this integral value $D_2$ by this integration interval. Note that this integral value $D_2$ is the work that is applied to the golf club 4 during the swing motion, and can serve as an indicator representing the club input power. Note that the integration interval shown here is an illustration, and an interval such as from time $t_t$ to time $t_i$ of impact, for example, can be set as appropriate.

The abovementioned arm output powers $P_1$ and $P_{1\_AVE}$ can be rephrased as being indicators representing the strength with which the golfer 7 holds the wrist cock during the swing motion. Also, the club input powers $P_2$ and $P_{2\_AVE}$ can be rephrased as being indicators representing the strength with which the golfer 7 releases the wrist cock during the swing motion.

In the following step S37, the calculation part 24D calculates a wrist cock release timing $t_r$ during the swing motion. Note that the inventors discovered, through testing, that the head speed $V_h$ at the time of impact is correlated with the wrist cock release timing $t_r$ during the swing motion and the arm energy $E_1$ or the average power $E_{AVE}$. In view of this, here, the wrist cock release timing $t_r$ is calculated in order to calculate the head speed $V_h$ at the time of impact. In the present embodiment, the time at which the power $E_1'$ of the arm is maximized in the interval from time $t_t$ to time $t_i$ is specified as the wrist cock release timing $t_r$.

In the following step S38, the calculation part 24D calculates the head speed $V_h$ at the time of impact, based on the wrist cock release timing $t_r$ and the arm energy $E_{AVE}$. Specifically, the head speed $V_h$ at the time of impact is calculated in accordance with the following equation. Note that $k_1$, $k_2$ and $k_3$ are the constants obtained by multiple regression analysis from the results of numerous tests performed in advance, and are values that are held in advance in the storage part 23. This ends the indicator calculation process.

$$V_h = k_1 \cdot E_{AVE} + k_2 \cdot t_r + k_3$$

2-6. Optimal Shaft Weight Determination Process

Figure 13:
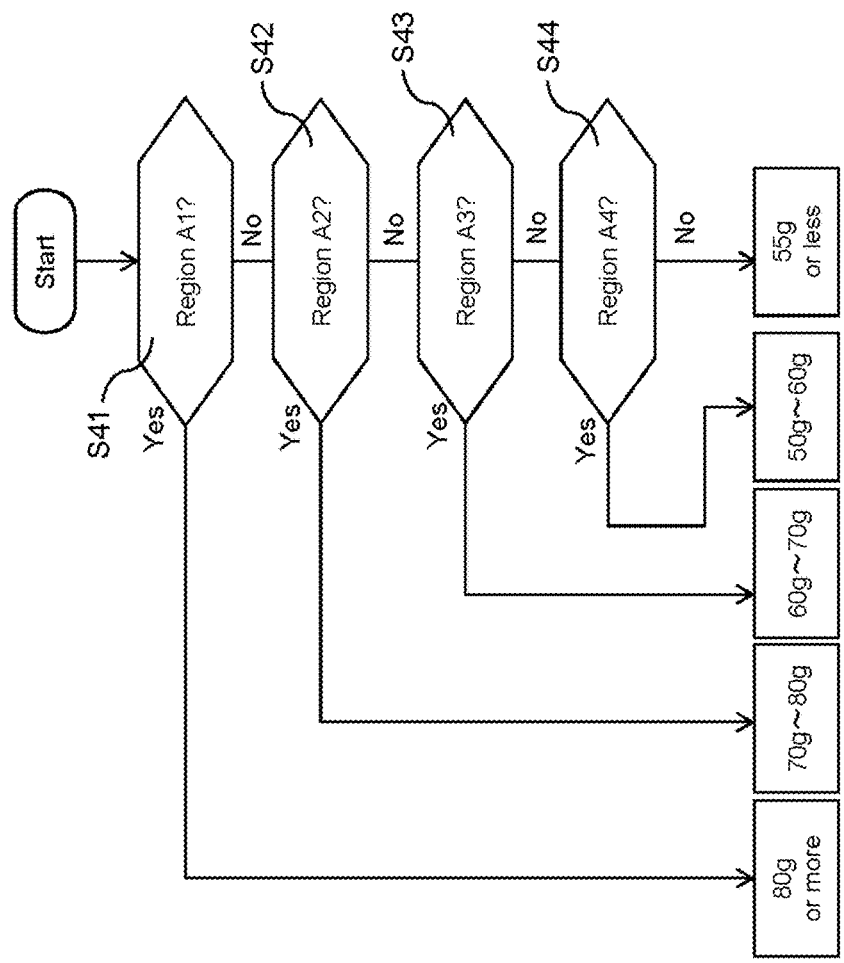
FIG. 13 is a flowchart showing the flow of an optimal shaft weight determination process.

Hereinafter, the flow of the optimal shaft weight determination process (S6) will be described, with reference to FIG. 13. The optimal shaft weight determination process is a step for determining the range of the optimal shaft weight (hereinafter, optimal shaft weight zone), according to the size of the arm output power $P_{1\_AVE}$ and the club input power $P_{2\_AVE}$. Here, the optimal shaft weight zone is set to a value that gradually increases with an increase in the values of $P_{1\_AVE}$ and $P_{2\_AVE}$.

First, in step S41, the determination part 24E determines whether the point that is represented by $(P_{1\_AVE}, P_{2\_AVE})$ calculated in the first indicator calculation process is on the upper side of a straight line L1 in the $P_{1\_AVE}$-$P_{2\_AVE}$ plane shown in FIG. 14, that is, whether this point belongs to a region A1 of FIG. 14 (hereinafter, condition 1). If condition 1 is satisfied, it is determined that 80 g or more is the optimal shaft weight zone. On the other hand, if condition 1 is not satisfied at step S41, the processing advances to step S42. In step S42, the determination part 24E determines whether the point that is represented by $(P_{1\_AVE}, P_{2\_AVE})$ calculated in the first indicator calculation process is on the upper side of a straight line L2 and on the lower side of the straight line L1 in the $P_{1\_AVE}$-$P_{2\_AVE}$ plane shown in FIG. 14, that is, whether this point belongs to a region A2 of FIG. 14 (hereinafter, condition 2). If condition 2 is satisfied, it is determined that 70 g or more to less than 80 g is the optimal shaft weight zone. On the other hand, if condition 2 is not satisfied at step S42, the processing advances to step S43. In step S43, the determination part 24E determines whether the point that is represented by $(P_{1\_AVE}, P_{2\_AVE})$ calculated in the first indicator calculation process is on the upper side of a straight line L3 and on the lower side of the straight line L2 in the $P_{1\_AVE}$-$P_{2\_AVE}$ plane shown in FIG. 14, that is, whether this point belongs to a region A3 of FIG. 14 (hereinafter, condition 3). If condition 3 is satisfied, it is determined that 60 g or more to less than 70 g is the optimal shaft weight zone. On the other hand, if condition 3 is not satisfied at step S43, the processing advances to step S44. In step S44, the determination part 24E determines whether the point that is represented by $(P_{1\_AVE}, P_{2\_AVE})$ calculated in the first indicator calculation process is on the upper side of a straight line L4 and on the lower side of the straight line L3 in the $P_{1\_AVE}$-$P_{2\_AVE}$ plane shown in FIG. 14, that is, whether this point belongs to a region A4 of FIG. 14 (hereinafter, condition 4). If condition 4 is satisfied, it is determined that 50 g or more to less than 60 g is the optimal shaft weight zone. On the other hand, if condition 4 is not satisfied at step S44, that is, if the point that is represented by ($P_{1\_AVE}$, $P_{2\_AVE}$) calculated in the first indicator calculation process is on the lower side of a straight line L4 in the $P_{1\_AVE}$-$P_{2\_AVE}$ plane shown in FIG. 14, that is, belongs to a region A5 of FIG. 14, it is determined that 55 g or less is the optimal shaft weight zone.

The optimal shaft weight determination process above is based on the following findings. That is, the inventors got a large number of golfers to swing a test club, and calculated the arm output power $P_{1\_AVE}$ and the club input power $P_{2\_AVE}$ at this time. Also, the inventors got the same golfers to swing golf clubs of various shaft weights, calculated the shaft weight that gave the greatest driving distance, and took this as the optimal shaft weight.

From the above testing, it was confirmed that there is a tendency for the optimal shaft weight to increase with an increase in both the arm output power $P_{1\_AVE}$ and the club input power $P_{2\_AVE}$ at the time of swinging the test club by the same golfer. As a result, the inventors discovered that the regions A1 to A5 corresponding to the optimal shaft weight zone are definable by regionally dividing the arm output power $P_{1\_AVE}$-club input power $P_{2\_AVE}$ space, as shown in FIG. 14. That is, the abovementioned steps S41 to S44 are steps for determining the optimal shaft weight zone, according to which region of the $P_{1\_AVE}$-$P_{2\_AVE}$ space the point indicating the arm output power $P_{1\_AVE}$ and the club input power $P_{2\_AVE}$ is plotted in. The threshold that is used in the determination at steps S41 to S44, or in other words, information for specifying the boundary lines L1 to L4 of the divided regions A1 to A5 shown in FIG. 14 and the like are stored in the storage part 23 as the correspondence relationship data 28. That is, the correspondence relationship data 28 is data that determines the correspondence relationship between the sizes of $P_{1\_AVE}$ and $P_{2\_AVE}$, and the optimal shaft weight zone. Note that the boundary lines L1 to L4 are roughly parallel to each other, and are both straight lines having a negative slope in the $P_{1\_AVE}$-$P_{2\_AVE}$ plane. At steps S41 to S44, the above determination is performed with reference to the correspondence relationship data 28 in this storage part 23. Note that, in FIG. 2, the correspondence relationship data 28 is shown as separate data to the program 3 but may be incorporated in the program 3.

2-7. Second Indicator Calculation Process

Hereinafter, the second indicator calculation process (S7) of calculating the second swing indicator, based on the sensor data obtained in the measurement process, will be described. The second swing indicator is an indicator for determining the optimal rigidity indicator, and is a feature amount characterizing the swing motion by the golfer 7. In the present embodiment, first to fourth feature amounts $F_1$ to $F_4$ which will be discussed later are calculated as the second swing indicator.

In order to understand the first to fourth feature amounts $F_1$ to $F_4$, it is important to first understand the optimal rigidity indicator. The optimal rigidity indicator is an indicator representing the rigidity of the shaft 40 suitable for the golfer 7, and, in the present embodiment, the rigidity of the shaft 40 is evaluated as the distribution of the flexural rigidity (hereinafter, EI distribution) at a plurality of positions of the shaft 40. The EI distribution according to the present embodiment is quantitatively represented using a numerical value, and, more specifically, is calculated using the International Flex Code (IFC). Thus, the IFC will be described first. Note that the IFC is a well-known indicator indicating the characteristics of shafts widely proposed by the applicant, and has already been described in detail in various publications, including Patent Literature 1, for example. Accordingly, it is not absolutely necessarily to describe the IFC again here, although a description will also be given here for reference purposes.

Figure 15:
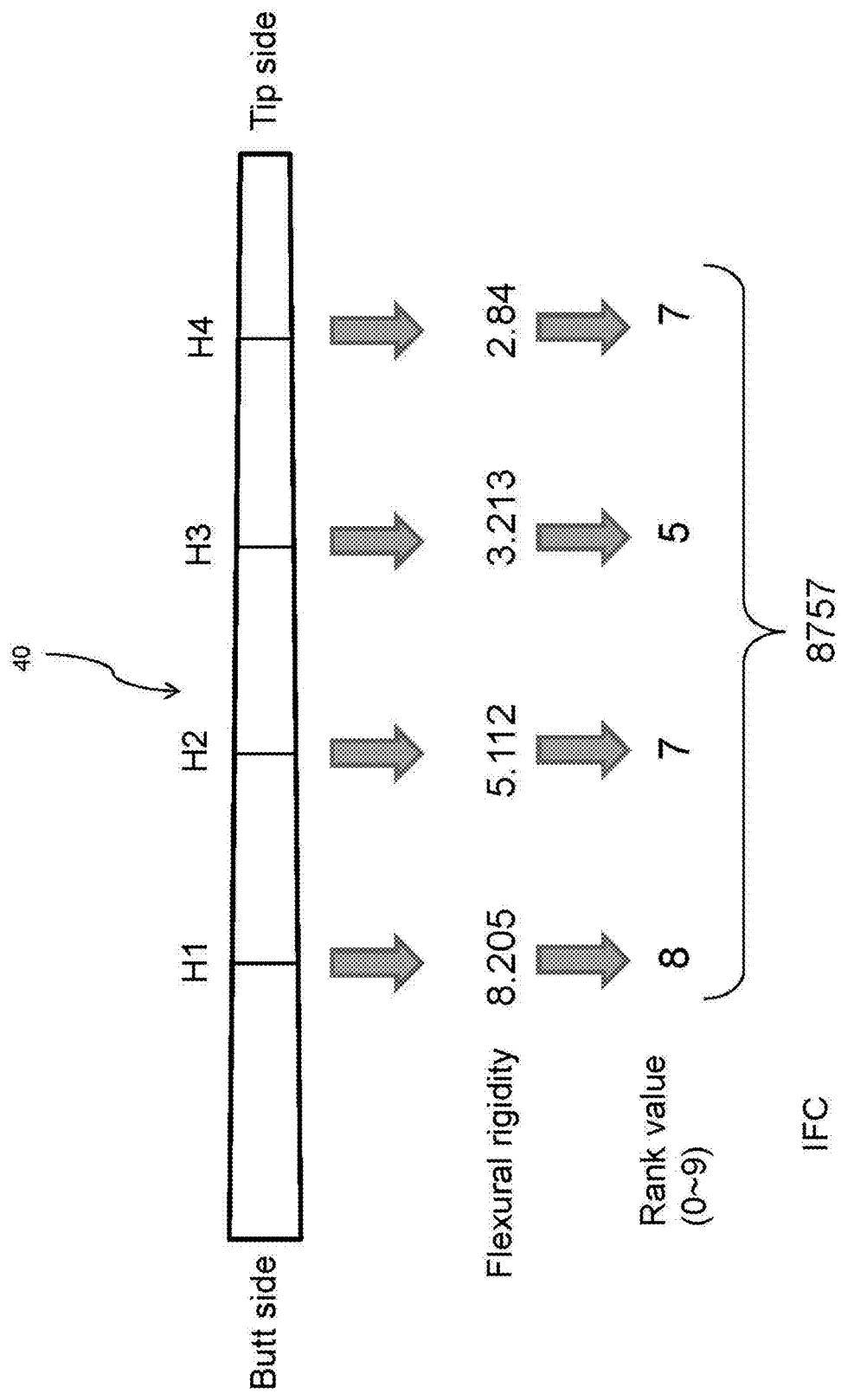
FIG. 15 is a diagram illustrating the International Flex Cord (IFC)

The IFC is, as shown in FIG. 15, a code in which the flexural rigidity of the shaft 40 at each of four positions H1 to H4 in the direction in which the shaft 40 extends is represented with a single digit numerical value from 0 to 9, and these four numerical values are arrayed in the direction in which the shaft 40 extends. More specifically, the four measurement points H1 to H4 are defined from the butt end of the shaft 40 toward the tip end at roughly fixed intervals in this order. For example, places 36, 26, 16 and 6 inches from the tip end of the shaft 40 can be respectively set as the measurement point H1, the measurement point H2, the measurement point H3 and the measurement point H4. Values (hereinafter, EI values) $J_1$ to $J_4$ of the flexural rigidity at each of these four measurement points H1 to H4 are then measured.

Figure 16:
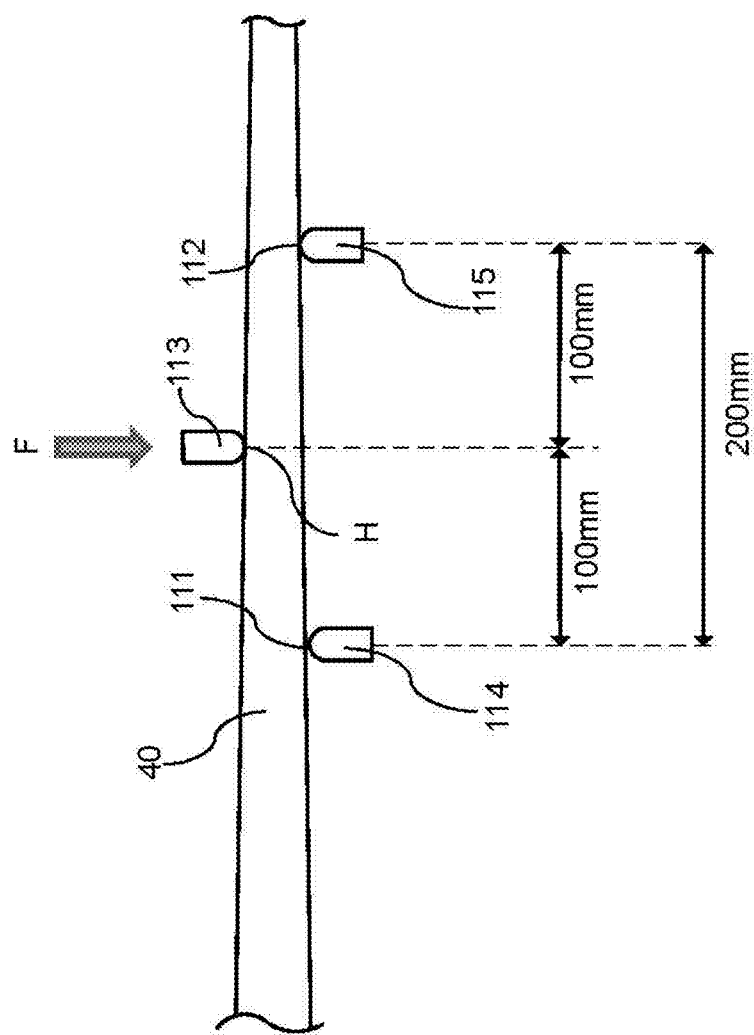
FIG. 16 is a diagram illustrating a method for measuring the flexural rigidity of a shaft.

The EI value ($N \cdot m^2$) at each measurement point H of the shaft 40 (H1 to H4) can be measured with various methods, and can, for example, be measured as shown in FIG. 16 using a model 2020 measuring machine manufactured by INTESCO, Co., Ltd. (max. load: 500 kgf). With this measuring method, the amount of flex when a load F is applied to the measurement points H from above is measured, while supporting the shaft 40 from below at two support points 111 and 112. The distance (span) between the support point 111 and the support point 112 can be set to 200 mm, for example, and the measurement points H can be set to intermediate points between the support point 111 and the support point 112. More specifically, an indenter 113 is moved downward at constant speed (e.g., 5 mm/min.) at the measurement points H, in a state where supports 114 and 115 that support the support points 111 and 112 are fixed. The movement of the indenter 113 is ended at the point in time at which the load F reaches 20 kgf, the flex amount of the shaft 40 (mm) at this moment is measured, and this flex amount is converted into an EI value ($N \cdot m^2$).

Next, the EI values $J_1$ to $J_4$ at the four measurement points H1 to H4 above are respectively converted into 10-level rank values $K_1$ to $K_4$. Specifically, the rank values $K_1$ to $K_4$ can be respectively calculated from the EI values $J_1$ to $J_4$, in accordance with the following conversion tables (Tables 1 to 4) for the measurement points H1 to H4 (the rank values after conversion are shown in the IFC column in Tables 1 to 4). The four rank values $K_1$ to $K_4$ thus respectively assigned to the measurement points H1 to H4 are then arrayed such that the value corresponding more on the butt side is more to the left and the value corresponding more on the tip side is more to the right. The 4-digit code thus obtained is the IFC. With the IFC, the rigidity at a corresponding position is higher the larger the numerical value of each digit.

TABLE 1

(a) 36-inch IFC

| | EI Value[×9.8 N · m²] | | |
|---|---|---|---|
| IFC | Max. | ~ | Min. |
| 9 | | ~ | 8.295 |
| 8 | 8.295 | ~ | 7.86 |
| 7 | 7.86 | ~ | 7.425 |

TABLE 1-continued (a) 36-inch IFC

| IFC | Max. | ~ | Min. |
|---|---|---|---|
| | EI Value[×9.8 N · m²] | | |
| 6 | 7.425 | ~ | 6.99 |
| 5 | 6.99 | ~ | 6.555 |
| 4 | 6.555 | ~ | 6.12 |
| 3 | 6.12 | ~ | 5.685 |
| 2 | 5.685 | ~ | 5.25 |
| 1 | 5.25 | ~ | 4.185 |
| 0 | 4.185 | ~ | 0 |

TABLE 2

(b) 26-inch IFC

| IFC | Max. | ~ | Min. |
|---|---|---|---|
| | EI Value[×9.8 N · m²] | | |
| 9 | | ~ | 5.543 |
| 8 | 5.543 | ~ | 5.306 |
| 7 | 5.306 | ~ | 5.069 |
| 6 | 5.069 | ~ | 4.832 |
| 5 | 4.832 | ~ | 4.595 |
| 4 | 4.595 | ~ | 4.358 |
| 3 | 4.358 | ~ | 4.121 |
| 2 | 4.121 | ~ | 3.884 |
| 1 | 3.884 | ~ | 3.647 |
| 0 | 3.647 | ~ | 0 |

TABLE 3

(c) 16-inch IFC

| IFC | Max. | ~ | Min. |
|---|---|---|---|
| | EI Value[×9.8 N · m²] | | |
| 9 | | ~ | 3.849 |
| 8 | 3.849 | ~ | 3.658 |
| 7 | 3.658 | ~ | 3.467 |
| 6 | 3.467 | ~ | 3.276 |
| 5 | 3.276 | ~ | 3.085 |
| 4 | 3.085 | ~ | 2.894 |
| 3 | 2.894 | ~ | 2.703 |
| 2 | 2.703 | ~ | 2.512 |
| 1 | 2.512 | ~ | 2.321 |
| 0 | 2.321 | ~ | 0 |

TABLE 4

(d) 6-inch IFC

| IFC | Max. | ~ | Min. |
|---|---|---|---|
| | EI Value[×9.8 N · m²] | | |
| 9 | | ~ | 2.94 |
| 8 | 2.94 | ~ | 2.86 |
| 7 | 2.86 | ~ | 2.78 |
| 6 | 2.78 | ~ | 2.7 |
| 5 | 2.7 | ~ | 2.62 |
| 4 | 2.62 | ~ | 2.54 |
| 3 | 2.54 | ~ | 2.46 |
| 2 | 2.46 | ~ | 2.38 |
| 1 | 2.38 | ~ | 2.3 |
| 0 | 2.3 | ~ | 0 |

In the second indicator calculation process, the first to fourth feature amounts $F_1$ to $F_4$ are calculated by the calculation part 24D. In the present embodiment, the first to fourth feature amounts $F_1$ to $F_4$ are respectively indicators for determining optimal EI values $J_{S1}$ to $J_{S4}$, which are the EI values $J_1$ to $J_4$ suitable for the golfer 7, and, by extension, optimal rank values $K_{S1}$ to $K_{S4}$, which are the rank values $K_1$ to $K_4$ suitable for the golfer 7. Thus, in the present embodiment, feature amounts that are respectively correlated with the optimal EI values $J_{S1}$ to $J_{S4}$, are selected as the first to fourth feature amounts $F_1$ to $F_4$. Also, although, in the present embodiment, the following indicators are used as the first to fourth feature amounts $F_1$ to $F_4$, other suitable feature amounts can be used as the second swing indicator, as long as the correlation with the optimal rigidity indicator is recognized.

The first feature amount $F_1$ is inclination of the angular velocity $\omega_y$ of the direction of the wrist cock in a vicinity of top, for example, can be represented with the sum of the absolute value of the angular velocity $\omega_y$ 50 ms before top, and the absolute value of the angular velocity $\omega_y$ 50 ms after top.

The second feature amount $F_2$ is the average value of the angular velocities $\omega_y$ from the time of top to the time at which the angular velocity $\omega_y$ is maximized. First, the second feature amount $F_2$ is calculated by deriving the point in time at which the angular velocity $\omega_y$ is maximized in the time period from top to impact, and dividing the accumulated value of the angular velocities $\omega_y$ from top to this point in time by the time period from top to this point in time.

The third feature amount $F_3$ is the average value of the angular velocities $\omega_y$ from the time at which the angular velocity $\omega_y$ is maximized to the time of impact. The third feature amount $F_3$ is calculated by dividing the accumulated value of the angular velocities $\omega_y$ from the time at which the angular velocity $\omega_y$ is maximized to the time of impact by time period from the time at which the angular velocity $\omega_y$ is maximized to the time of impact.

The fourth feature amount $F_4$ is the average value of the angular velocities $\omega_y$ from top to impact, and is calculated by dividing the accumulated value of the angular velocities $\omega_y$ from top to impact by the time period from top to impact.

Figure 17:
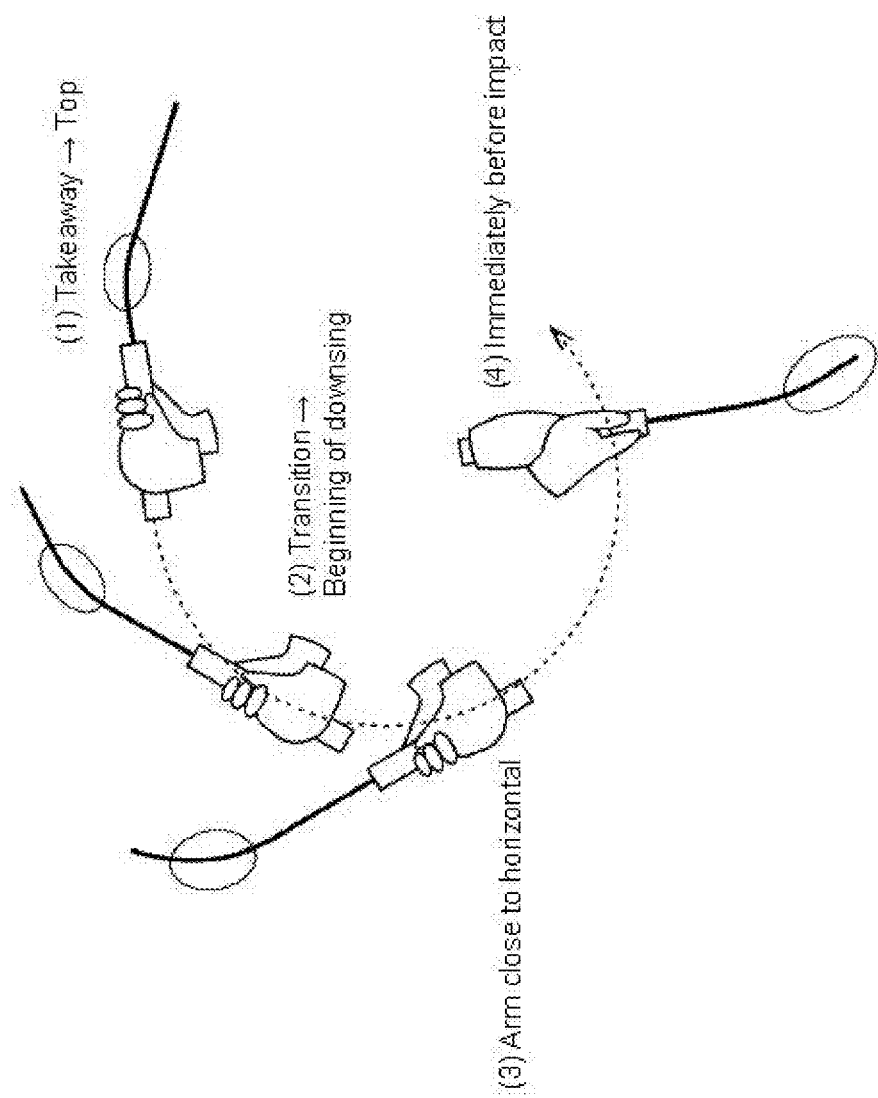
FIG. 17 is a diagram illustrating bending of the shaft during a swing.

Incidentally, during the swing motion, the shaft 40 of the golf club 4 bends due to that inertia of the head 41, since the head 41, which is comparatively heavy, exists at the tip of the golf club. This bending is, in the overall process of the swing, transmitted from the butt side of the shaft 40 to the tip side from top toward impact, such as shown in FIG. 17, rather than occurring at the same place on the shaft 40. In other words, the position of the bend in the shaft 40 moves from the butt side of the shaft 40 to the tip side, as the swing proceeds toward impact from top.

More specifically, at the point in time at which the golf club is taken back from address and reaches top (at the point in time shown in (1) of FIG. 17), bending occurs in a vicinity of the butt of the shaft 40. Subsequently, when transition is made and the swing reaches the early part of the downswing (at the point in time of (2) shown in FIG. 17), the bend moves slightly to the tip side of the shaft 40. Furthermore, at the point in time at which the arm of the golfer 7 become horizontal (at the point in time of (3) shown in FIG. 17), the bend moves further to the tip side than the middle of the shaft 40. Immediately before impact (at the point in time of (4) shown in FIG. 17) the bend moves to a vicinity of the tip of the shaft 40.

Accordingly, the first to fourth feature amounts $F_1$ to $F_4$ can respectively be calculated in the first to fourth intervals from a vicinity of top to a vicinity of impact during the swing motion. Also, the first to fourth intervals referred to here are arranged in time sequence in this order, and are intervals that either partially overlap or do not overlap each other at all.

2-8. Optimal Stiffness Determination Process

Next, the flow of the optimal rigidity determination process (S8) will be described. At this process, the determination part 24E determines the optimal rigidity indicator (optimal EI values $J_{si}$ to $J_{s4}$), in accordance with an approximate equation determined in advance representing the correlation between the second swing indicator (first to fourth feature amounts $F_1$ to $F_4$) and the optimal rigidity indicator (optimal EI values $J_{S1}$ to $J_{S4}$). The approximate equations according to the present embodiment are linear approximate equations, and are represented as follows.

$$J_{S1} = a_1 \cdot F_1 + b_1$$

$$J_{S2} = a_2 \cdot F_2 + b_2$$

$$J_{S3} = a_3 \cdot F_3 + b_3$$

$$J_{S4} = a_4 \cdot F_4 + b_4$$

The determination part 24E calculates the optimal EI values $J_{S1}$ to $J_{S4}$, by substituting the first to the fourth feature amounts $F_1$ to $F_4$ calculated in the second indicator calculation process into these approximate equations. Also, the determination part 24E respectively converts the optimal EI values $J_{S1}$ to $J_{S4}$ into the optimal rank values $K_{S1}$ to $K_{S4}$, in accordance with the abovementioned conversion tables of Tables 1 to 4.

Note that a1-a4 and b1-b4 in the above equation are constants obtained by regression analysis from results of numerous tests performed in advance, and are values that are held in advance in the storage part 23. The testing referred to here can be performed as follows, similarly to Patent Literature 1, for example. That is, first, a large number of golfers are each made to swing a plurality of golf clubs, and the flight distance, the directivity (right-left shift) of the ball, and the ease of swinging obtained through sensory analysis at this time are converted into numerical values. The golf club suitable for each golfer is then determined from the numerical values, and the EI value of that golf club is set as the optimal EI value of that golfer. Also, the first to fourth feature amounts $F_1$ to $F_4$ of each golfer are calculated with a method similar to the above. After such a testing, a1 to a4 and b1 to b4 are then calculated by performing regression analysis on the data of the optimal EI value and the first to fourth feature amounts $F_1$ to $F_4$ for a large number of golfers.

Also, the values of a1 to a4 and b1 to b4 can be changed according to a condition, in order to obtain a more reliable approximate equation. For example, an approximate equation can be provided, according to the head speed $V_h$. As an example, the above test data can be classified according to the head speed zone (e.g., 45 m/s or more, 41 to 45 m/s, 41 m/s or less), the approximate equation can be created only for data belonging to the same classification, and a1 to a4 and b1 to b4 can be determined. In the optimal rigidity determination process, it is then determined which head speed zone the head speed $V_h$ of the golfer 7 belongs to, and the optimal rank values $K_{S1}$ to $K_{S4}$ serving as the optimal rigidity indicator are calculated, using the approximate equation corresponding to that head speed zone.

Also, in the present embodiment, not only the optimal rank values $K_{S1}$ to $K_{S4}$ but also optimal flex is determined as an optimal rigidity indicator. Specifically, the determination part 24E determines the optimal flex, based on the optimal rank values $K_{S1}$ to $K_{S4}$. Flex is an indicator evaluating the stiffness (flexural rigidity) of the shaft 40 as a whole.

Accordingly, if the optimal rank values $K_{S1}$ to $K_{S4}$ representing the flexural rigidity suitable for the golfer 7 at a plurality of positions of the shaft 40 are known, the optimal flex can be computed based on these values. For example, the optimal rank value at a specific position can also be taken as the optimal flex, or the average value of the optimal rank values at a plurality of positions can also be taken as the optimal flex. Although there are various types of flex such as "SR", "S" and "X", for example, the optimal flex does not need to be specified as one of these, can be set to have a range such as "SR" or "S", or "S" or "X".

Note that in other embodiments, the optimal flex can also be calculated directly from the optimal EI values $J_{S1}$ to $J_{S4}$, rather than with the optimal rank values $K_{S1}$ to $K_{S4}$, or can also be calculated without being based on these values $J_{S1}$ to $J_{S4}$ or $K_{S1}$ to $K_{S4}$. In the latter case, a suitable feature amount that is capable of specifying the optimal flex may be calculated in the second swing indicator determination process.

2-9. Recommended Shaft Selection Process

When the optimal shaft weight zone and the optimal rigidity indicator (the optimal EI values $J_{S1}$ to $J_{S4}$, the optimal rank values $K_{S1}$ to $K_{S4}$, and the optimal flex) are determined as a result of the above processes S1 to S8, the selection part 24F executes the recommended shaft selection process (S9). In this process, the shaft 40 (hereinafter, recommended shaft) suitable for the golfer 7 is specified from among a large number of shafts registered in the shaft DB 29. Also, in the present embodiment, a first recommended shaft, which is a shaft that is based on the optimal shaft weight zone, and a second recommended shaft, which is a recommended shaft that is based on the weight (hereinafter, my club weight) of the golf club that the golfer 7 normally uses are determined as recommended shafts.

A method of determining the first recommended shaft will be described. First, the selection part 24F reads out information indicating the specifications of all the shafts 40 that are registered in the shaft DB 29. The information indicating the specifications of the shaft 40 that are registered in the shaft DB 29 includes manufacturer, model number, EI values $J_1$ to $J_4$ and rank values $K_1$ to $K_4$ (IFC) at the four positions H1 to H4, and the weight, flex, torque and kick point of the shaft 40. The selection part 24F then specifies a first narrowed down shaft from among all the shafts 40 that are registered in the shaft DB 29, with reference to this information. The first narrowed down shaft is the shaft 40 whose weight belongs to the optimal shaft weight zone and whose flex matches the optimal flex. Note that there are normally a large number of first narrowed down shafts.

Next, the selection part 24F calculates, for each first narrowed down shaft, the degree of coincidence with the rank values $K_1$ to $K_4$ of that shaft and with the optimal rank values $K_{S1}$ to $K_{S4}$ determined in the optimal rigidity determination process, and specifies the shafts with the highest degree of coincidence as the first recommended shaft. The degree of coincidence can be calculated in accordance with the following equation 25, for example, with the degree of coincidence being higher the smaller the value.

$$\text{(degree of coincidence)} = \sum_{i=1}^{4} |K_i - K_{Si}| \quad \text{Equation 13}$$

Next, a method of determining of a second recommended shaft will be described. First, the selection part 24F determines the type of head 41 (hereinafter, recommended head) that should be used with the recommended golf club. The determination of the type of recommended head can also be performed by fitting processing that is not described in this specification, or can also be performed by asking the user questions via the display part 21 and the input part 22, and getting the user to select a desired head 41. Also, the selection part 24F asks the user questions via the display part 21 and the input part 22, and specifies my club weight.

Next, the selection part 24F reads out information indicating the specifications of the recommended head from the head DB 27, and reads out information indicating the specifications of all the shafts 40 that are registered in the shaft DB 29. The information indicating the specifications of the head 41 that is registered in the head DB 27 includes manufacturer, model number, weight, and the like. The selection part 24F then specifies a second narrowed down shaft from among all the shafts 40 that are registered in the shaft DB 29, with reference to this information. The second narrowed down shaft is a shaft 40 whose flex matches the optimal flex, and whose weight when combined with the recommended head is within a range of the my club weight±a predetermined value (value obtained by adding an error range for the weight of the grip, the weight of socket, etc.). Note that there are normally a large number of second narrowed down shafts.

Next, the selection part 24F, for each second narrowed down shaft, calculates the degree of coincidence between the rank values $K_1$ to $K_4$ of that shaft and the optimal rank values $K_{S1}$ to $K_{S4}$ determined in the optimal rigidity determination process, and specifies the shaft having the highest degree of coincidence as the second recommended shaft. The degree of coincidence can be calculated in accordance with the equation 13. Note that only one may be specified or a plurality of shafts may be specified, as the first recommended shaft. The same applies to the second recommended shaft.

2-10. Head Behavior Determination Process

Next, the determination part 24E performs the head behavior determination process (S10) for determining the behavior of the head 41, based on the image data obtained in the measurement process. In the present embodiment, the head speed $V_{hi}$ immediately before impact, the face angle at the time of impact, the angle of the head trajectory and the impact point are calculated as the behavior of the head 41. Note that the head trajectory as referred to here means the type of trajectory such as outside in, inside out and inside in, and a quantitative angle is calculated as the angle of the head trajectory. The impact point is the point at which the face surface 41*a* of the head 41 impacts the ball.

The head speed $V_{hi}$ immediately before impact is calculated as follows. That is, the interval between the light projectors 55A and 55B and between the light receivers 56A and 56B is known. Accordingly, since the head speed $V_{hi}$ immediately before impact can be calculated if timings t1 and t2 are known, the determination part 24E calculates the head speed $V_{hi}$, based on the information of timings t1 and t2.

Figure 18:
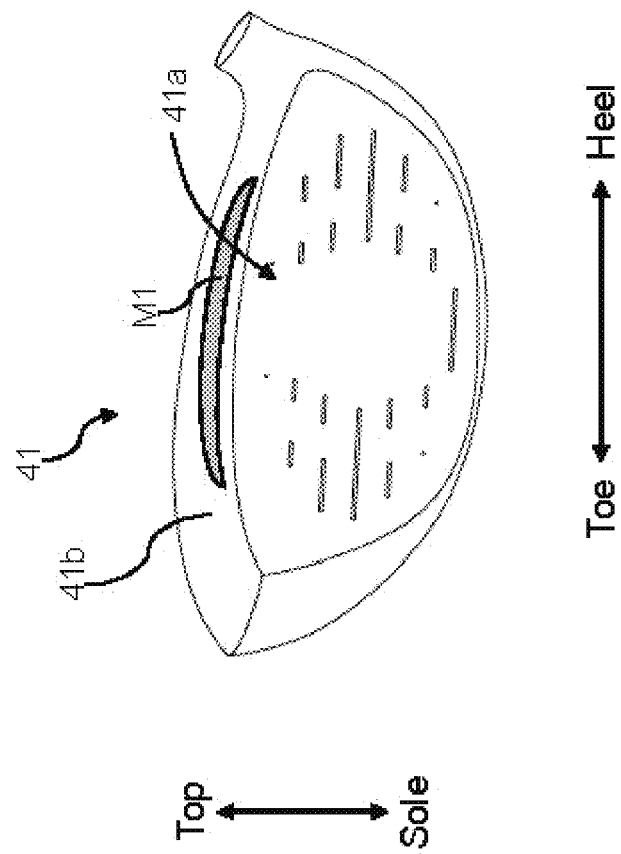
FIG. 18 is a view of a head from the face surface side.

Also, the face angle and head trajectory at the time of impact are determined by performing image processing on the image data. FIG. 18 is a view of the head 41 from the face surface 41*a* side. As shown in FIG. 18, a band-like marker M1 is adhered to a crown part 41*b* of the head 41 according to the present embodiment, so as to run along the face surface 41*a*. The marker M1 is formed with material that efficiently reflects light from the strobes 53 and 54. Accordingly, the region of the marker M1, or in other words, the band-like region that runs along the face surface 41*a* in plan view of the head 41, will appear clearly in the image shot by the camera 51. The determination part 24E extracts images of the marker M1 from the images shot at two timings immediately before impact (two images shot at the timing of light emission by the strobes 53 and 54) that are stored in the storage part 25. The face angle at the time of impact is then estimated, based on these images of the marker M1. Also, the determination part 24E calculates the angle that is formed by the vector connecting the center of gravity of these images of the marker M1 and the vector of the ball flight direction, specifies the type of trajectory such as outside in or the like from this angle, and determines this angle as the angle of the head trajectory.

Also, the determination part 24E determines the impact point by performing image processing on the image data. More specifically, the determination part 24E extracts images of the ball and the face surface 41*a* from the images at impact or the vicinity of impact, and calculates the impact point from the positional relationship thereof. In the present embodiment, it is quantitatively calculated how much the impact point has shifted in the toe-heel direction from the face center, which is the geometrical center of the face surface 41*a*.

2-11. Result Display Process

Next, the result display process (S11) for creating GUI screens showing the results of the above analysis and displaying the created GUI screens will be described. In the present embodiment, screens W1 to W5 such as shown in FIGS. 19 to 24 are displayed on the display part 21 as GUI screens.

The display control part 24G performs display on the display part 21 while switching between the screens W1 to W5 as appropriate, in response to operations performed by the user via the input part 22. In the present embodiment, the screens W1 to W4 are displayed in tab format as shown in FIGS. 19, 20, 22 and 24, and the screen corresponding to the tab that is currently selected is displayed on the display part 21.

Figure 19:
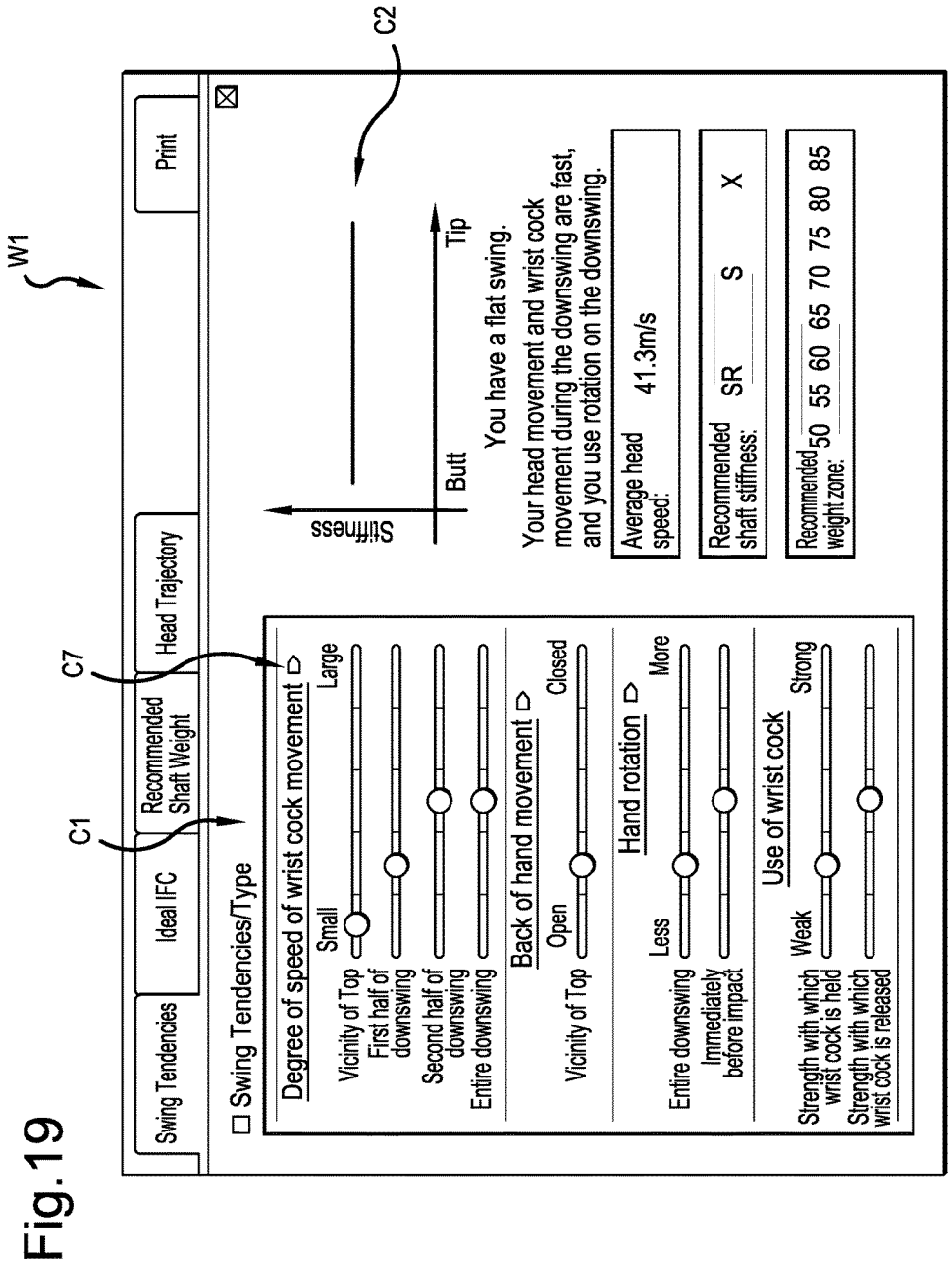
FIG. 19 is a diagram showing a GUI screen displaying analysis results.

The screen W1 shown in FIG. 19 is a screen corresponding to the "swing tendencies" tab, and, as the title of this tab suggests, principally displays the tendencies of the swing of the golfer 7. First, in a region C1 on the left half of the screen W1, "degree of speed of wrist cock movement", "back of hand movement", "hand rotation" and "use of wrist cock" are quantitatively displayed in slider format. Accordingly, the user who views the screen W1 can correctly evaluate the magnitude of the various indicators intuitively from a graphical viewpoint, namely, the position of the slider.

As "degree of speed of wrist cock movement", values for four periods including a vicinity of top, the first half of downswing, the second half of downswing and the entire downswing are displayed, with the implication being that the degree of speed is smaller the further the slider is disposed to the left and is larger the further the slider is disposed to the right. The "degree of speed of wrist cock movement" is determined by the determination part 24E based on the angular velocity $\omega_y$ of the corresponding period. As the "back of hand movement", a value in a vicinity of top is displayed, with the implication being that the back of the hand is more open the further the slider is disposed to the left and more closed the further the slider is disposed to the right. The "back of hand movement" is determined by the determination part 24E based on the angular velocity $\omega_x$ in a vicinity of top. As "hand rotation", values in two periods including the entire downswing and immediately before impact are displayed, with the implication being that there is less hand rotation the further the slider is disposed to the left and more hand rotation the further the slider is disposed to the right. The "hand rotation" is determined by the determination part 24E based on the angular velocity $\omega_z$ in the corresponding period.

As "use of wrist cock", "strength with which wrist cock is held", and "strength with which wrist cock is released" are displayed, with the implication being that "use of wrist cock" is weaker the further the slider is disposed to the left and stronger the further the slider is disposed to the right. The "strength with which wrist cock is held" is determined by the determination part 24E according to the abovementioned arm output power $P_{1\_AVE}$ of the golfer 7. The "strength with which wrist cock is released" is determined by the determination part 24E according to the abovementioned club input power $P_{2\_AVE}$ of the golfer 7.

The swing type of the golfer 7 is displayed in the upper right of the screen W1. The swing type of the golfer 7 is determined by the determination part 24E, based on the optimal EI values $J_{S1}$ to $J_{S4}$ (or the optimal rank values $K_{S1}$ to $K_{S4}$), that is, the IFC (hereinafter, ideal IFC) of the shaft 40 suitable for the golfer 7. More specifically, the swing type represents whether the four codes of the ideal IFC rise or decline from the butt to the tip of the shaft 40 or whether the codes protrude in the middle or are uniform. Here, an image C2 representing the ideal IFC in graph form is displayed in a graph region whose horizontal axis is the position of the shaft 40 in the length direction and whose vertical axis is the stiffness of the shaft 40. Since the swing type is, however, an indicator for finding out the type of golfer 7, a schematic graph is displayed, rather than the position of the shaft or the IFC codes being depicted exactly.

Also, on the screen W1, the abovementioned head speed $V_h$ (average value) is displayed as "average head speed", the optimal flex is displayed as "recommended shaft stiffness", and the optimal shaft weight zone is displayed as "recommended weight zone". The head speed $V_h$ (average value) is displayed numerically. On the other hand, the flex range of the shaft 40 and the shaft weight range that are registered in the shaft DB 29 are respectively displayed in the "recommended shaft stiffness" field and the "recommended weight zone" field in scale form, and the portion corresponding to the golfer 7 on these scales is highlighted. The user is thereby able to intuitively understand the optimal flex and the optimal shaft weight zone corresponding to a golfer, with reference to scales.

Figure 20:
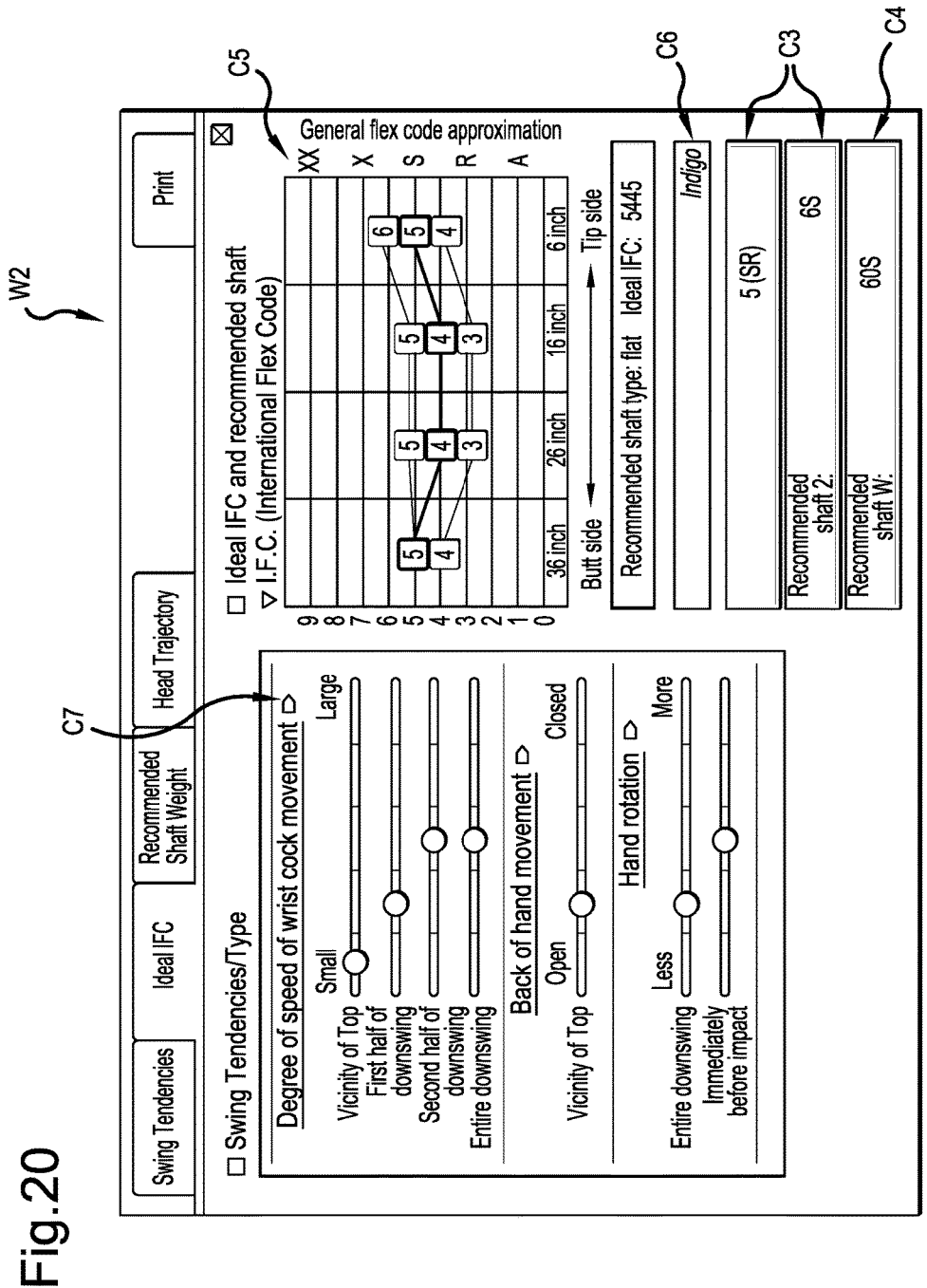
FIG. 20 is another diagram showing a GUI screen displaying analysis results.

The screen W2 shown in FIG. 20 is a screen corresponding to an "ideal IFC" tab, and principally displays the ideal IFC and the recommended shaft. On the screen W2, the code of the ideal IFC is displayed numerically, and the abovementioned swing type is displayed in text as "recommended shaft type". Also, on the screen W2, fields C3, C3 that display information specifying the top two second recommended shafts mentioned above are displayed as "recommended shaft 1" and "recommended shaft 2". Also, a field C4 that displays information specifying the one first recommended shaft mentioned above is displayed as "recommended shaft W". More specifically, in the fields C3, C3 and C4, manufacturer, model number, mass, flex, and the like are displayed. Note that this information is specified with reference to the shaft DB 29.

Also, on the screen W2, a graph region C5 for displaying the IFC of the one first recommended shaft and two second recommended shafts mentioned above in graph form is displayed in addition to the ideal IFC. These graphs are disposed in positions corresponding to the code of the IFC, and are constituted by plot points in which the code is written numerically, and straight line portions connecting these plot points. In the graph region C5, the graph of the ideal IFC is displayed in a different mode to the graphs of the IFCs corresponding to the three recommended shafts, and is preferably displayed in a mode that attracts the higher attention of the user (in FIG. 20, thick graph lines and large plot points). Also, it is preferable to provide the embellishment of the fields C3, C3 and C4 and the embellishment of the graphs corresponding thereto with a sense of unity, such that it can be understood at a glance which graphs correspond to which shafts specified by the fields C3, C3 and C4. For example, the colors of the characters in the fields C3, C3 and C4 can be matched with the colors of the graphs.

The fields C3, C3 and C4 are constituted so as to be exclusively selectable. The design image of the recommended shaft corresponding to the field that is currently selected is then displayed in a region C6. It can thereby be intuitively understand which shaft is the recommended shaft that is currently selected. Also, in the graph region C5, the graph of the IFC of the recommended shaft that is currently selected is displayed in a different mode from the graph of the IFC of other recommended shafts, and is preferably displayed in a mode that attracts the higher attention of the user (e.g., dark color for the former and light color for the latter).

Figure 21:
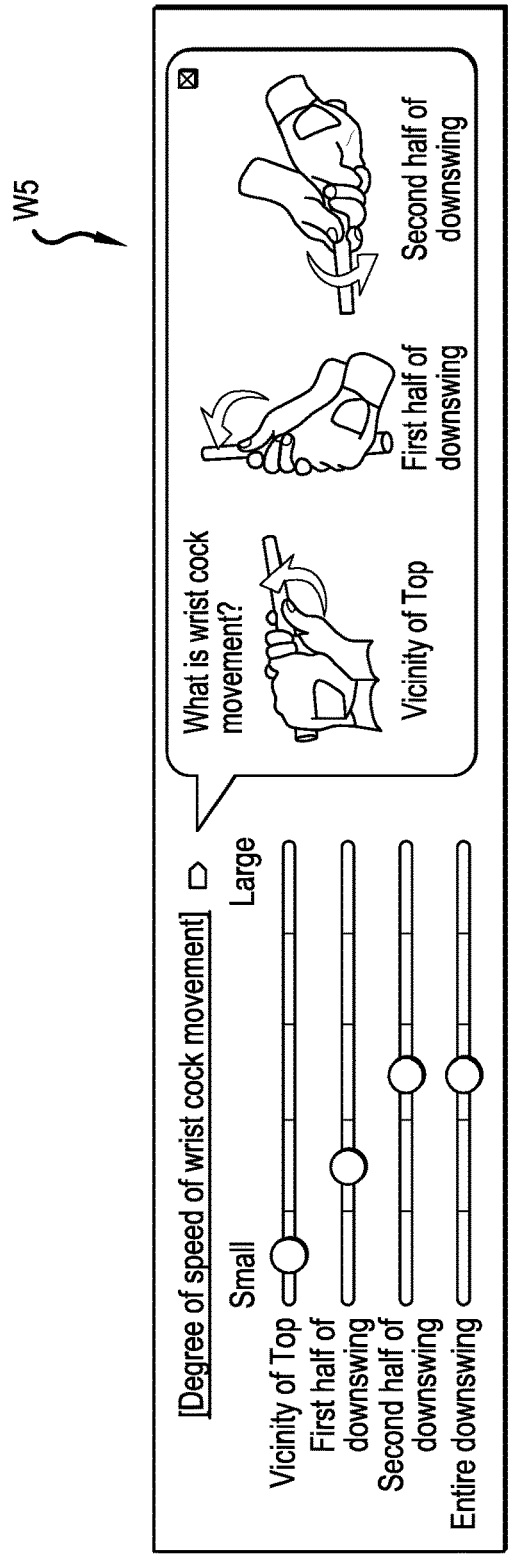
FIG. 21 is yet another diagram showing a GUI screen displaying analysis results.

Incidentally, in the example of FIG. 20, "degree of speed of wrist cock movement", "back of hand movement" and "hand rotation" are displayed on the left side of the screen W2 in the same format as FIG. 19. Also, in the field showing "degree of speed of wrist cock movement" on the screens W1 and W2, an icon C7 is displayed, and when this icon is selected, the screen W5 shown in FIG. 21 is displayed by pop-up. On this screen W5, images explaining what the degree of speed of wrist cock movement means are displayed. More specifically, on this screen W5, what the wrist cock movement means with respect to the direction in which the hands move is graphically explained using pictures of the hands, pictures of the shaft, arrows representing the direction of movement and the like.

Figure 22:
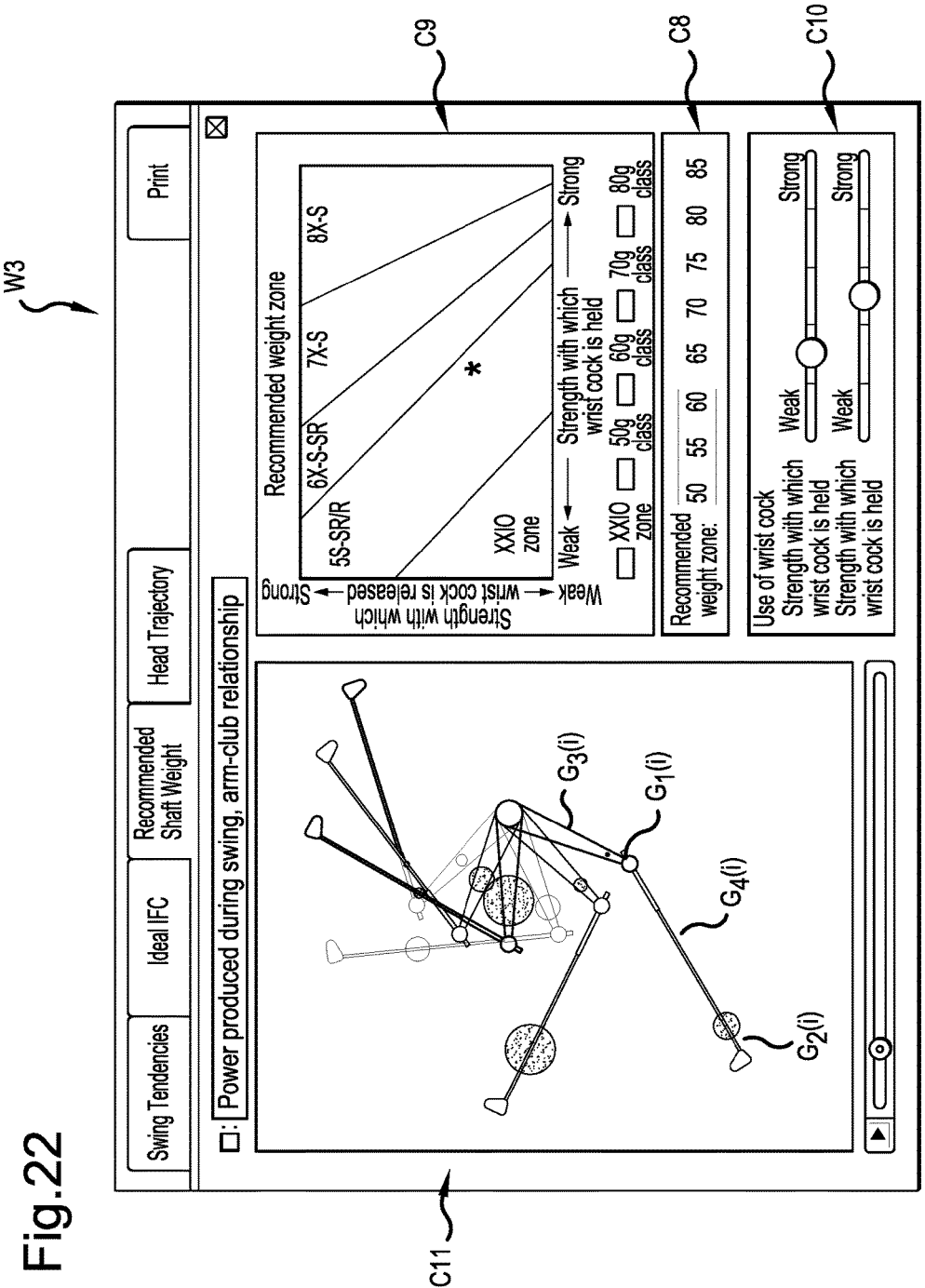
FIG. 22 is yet another diagram showing a GUI screen displaying analysis results.
Figure 23A:
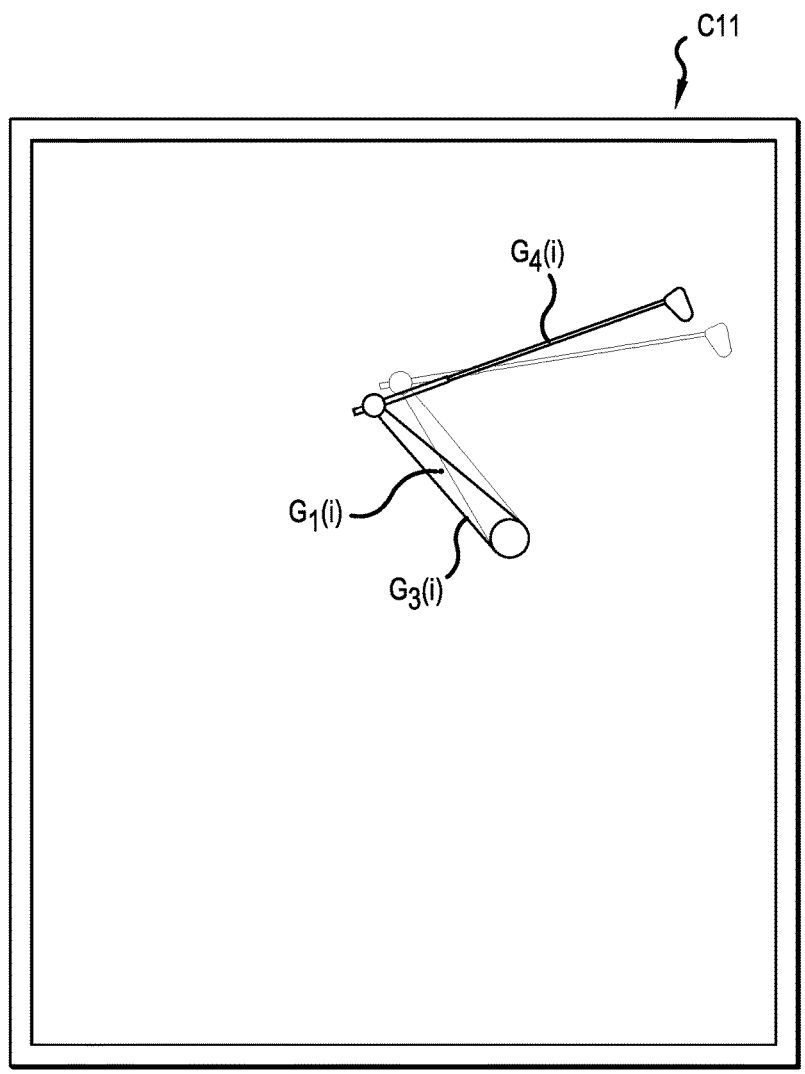
FIG. 23A is a diagram showing an image illustrating power that is produced during a swing.
Figure 23B:
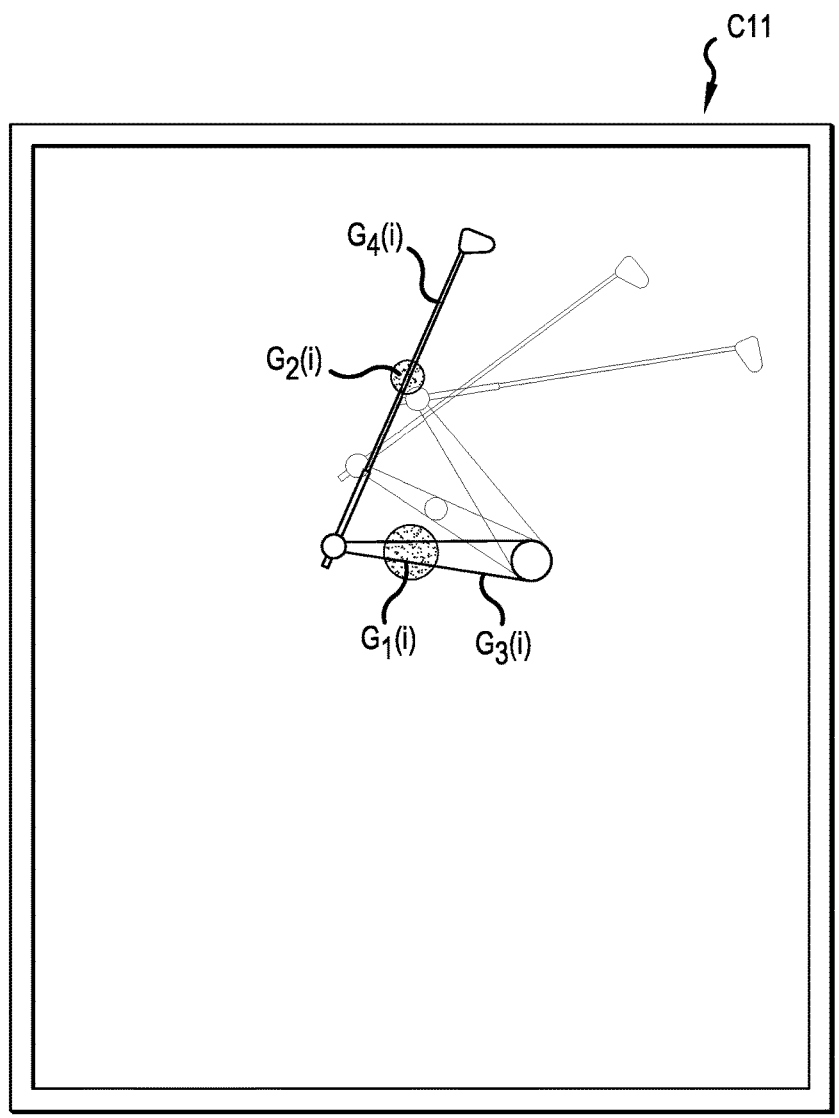
FIG. 23B is a diagram showing an image illustrating power that is produced during the swing at a timing thereafter.
Figure 23C:
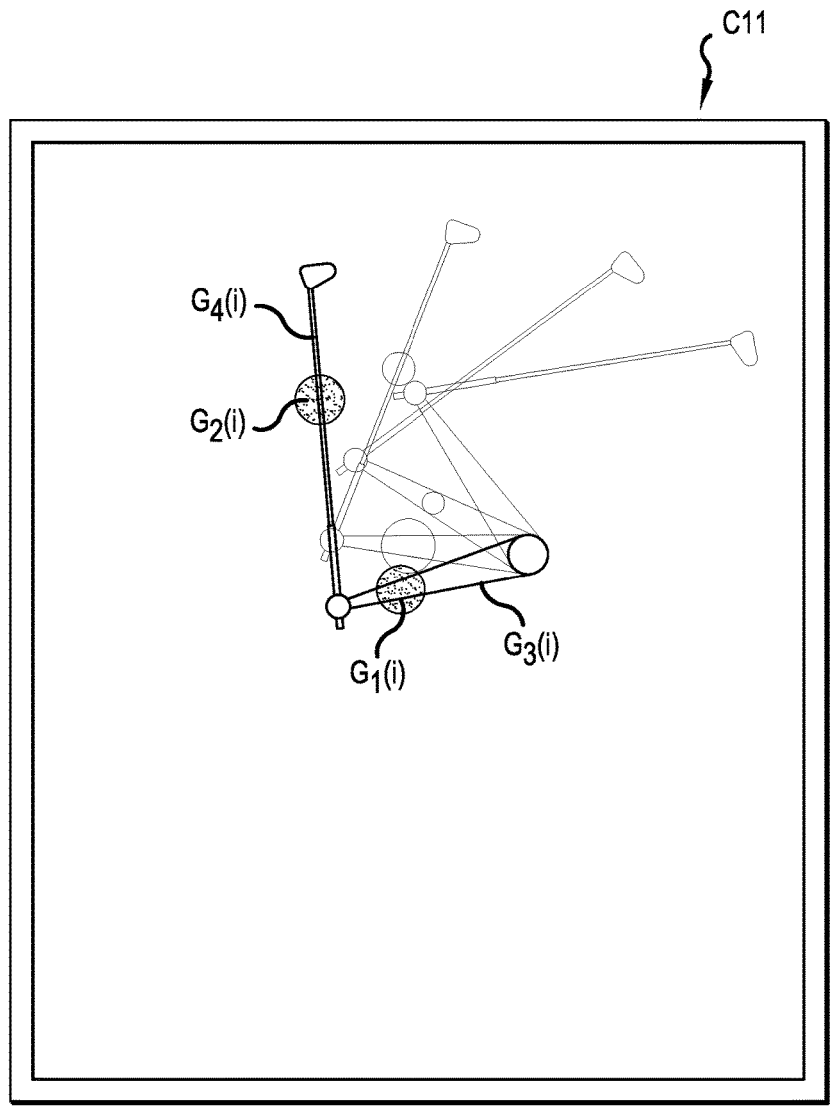
FIG. 23C is a diagram showing an image illustrating power that is produced during the swing at a further timing thereafter.
Figure 23D:
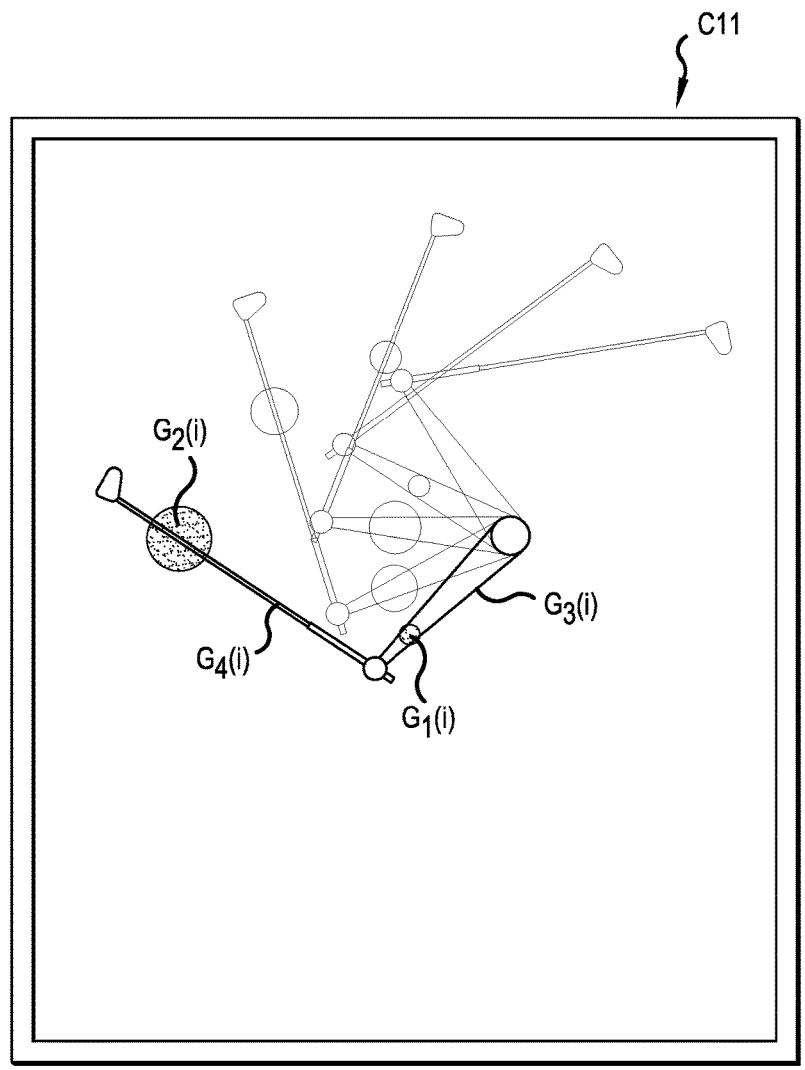
FIG. 23D is a diagram showing an image illustrating power that is produced during the swing at a further timing thereafter.
Figure 23E:
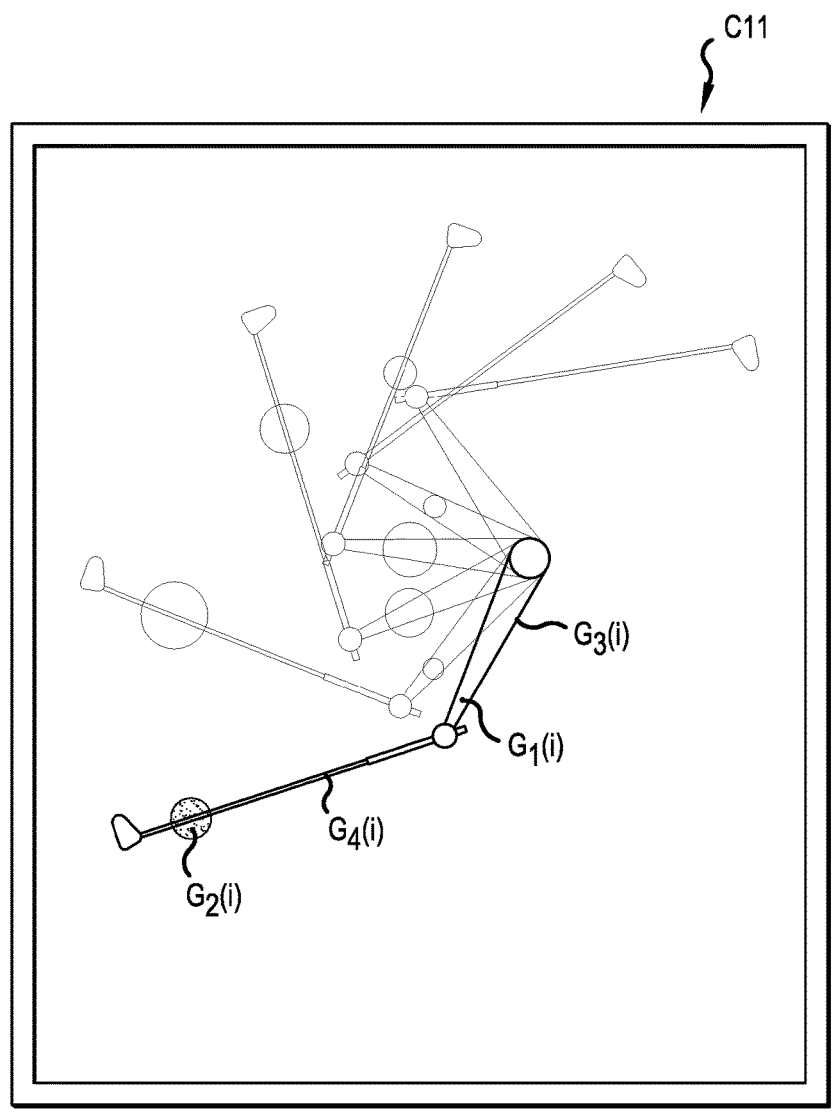
FIG. 23E is a diagram showing an image illustrating power that is produced during the swing at a further timing thereafter.
Figure 23F:
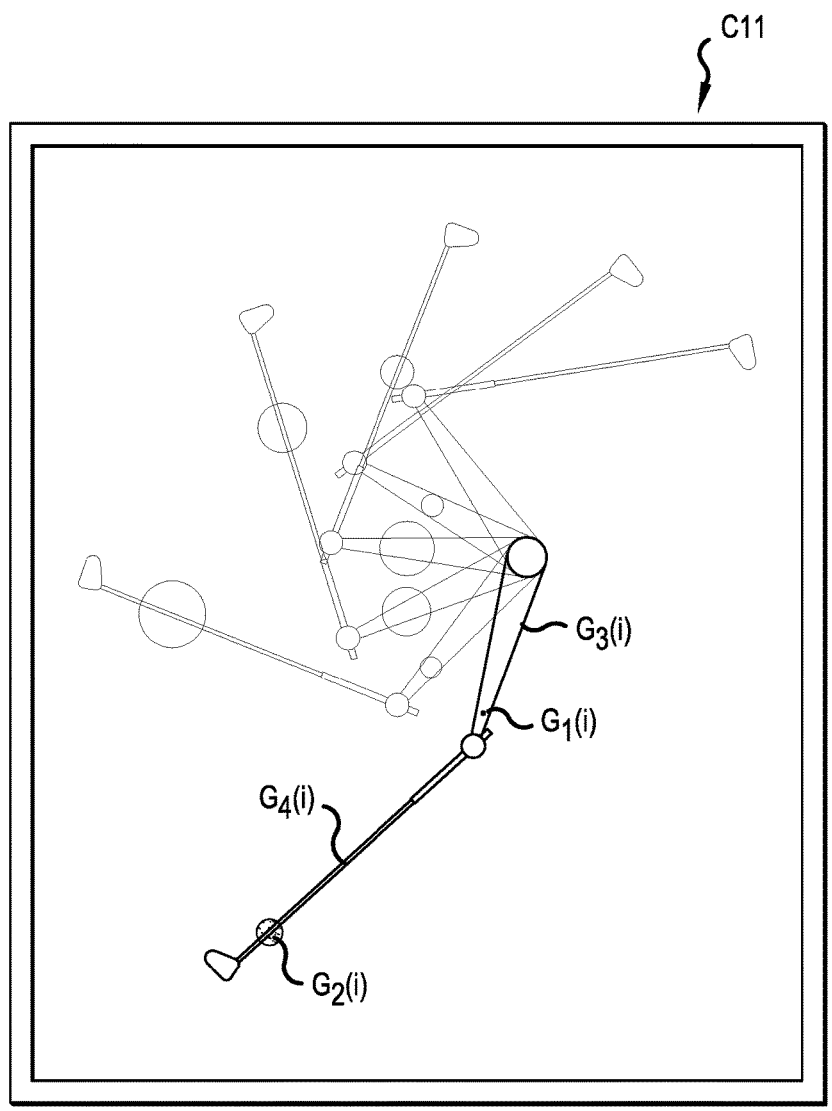
FIG. 23F is a diagram showing an image illustrating power that is produced during the swing at a further timing thereafter.

Next, the screen W3 shown in FIG. 22 is a screen corresponding to the tab "recommended shaft weight", and, as the title of this tab suggests, principally displays the weight zone of the shaft 40 to be recommended to the golfer 7. More specifically, on the screen W3, a field C8 "recommended weight zone" that displays the optimal shaft weight zone of the golfer 7 is displayed, similarly to the screen W1. The display form is similar to the screen W1, and in the field C8 the range of shaft weights that are registered in the shaft DB 29 is displayed in scale form, and a portion of the optimal shaft weight zone is highlighted on the scale. The user is thereby able to intuitively understand the optimal shaft weight zone, with reference to a scale.

Also, on the screen W3, various fields C9 and C10 for explaining the basis of the calculation in order to enhance the user's understanding about the optimal shaft weight zone are displayed. In the field C10, the arm output power $P_{1\_AVE}$ and the club input power $P_{2\_AVE}$ of the golfer 7, which are indicators for determining the optimal shaft weight zone, are displayed. More specifically, these indicators $P_{1\_AVE}$ and $P_{2\_AVE}$ are respectively displayed in slider format similarly to the screen W1, as "strength with which wrist cock is held" and "strength with which wrist cock is released". The user is thereby able to correctly understand intuitively the magnitude of the strength with which the wrist cock is held and the strength with which the wrist cock is released peculiar to the golfer 7, which forms the basis for determining the optimal shaft weight zone.

Figure 14:
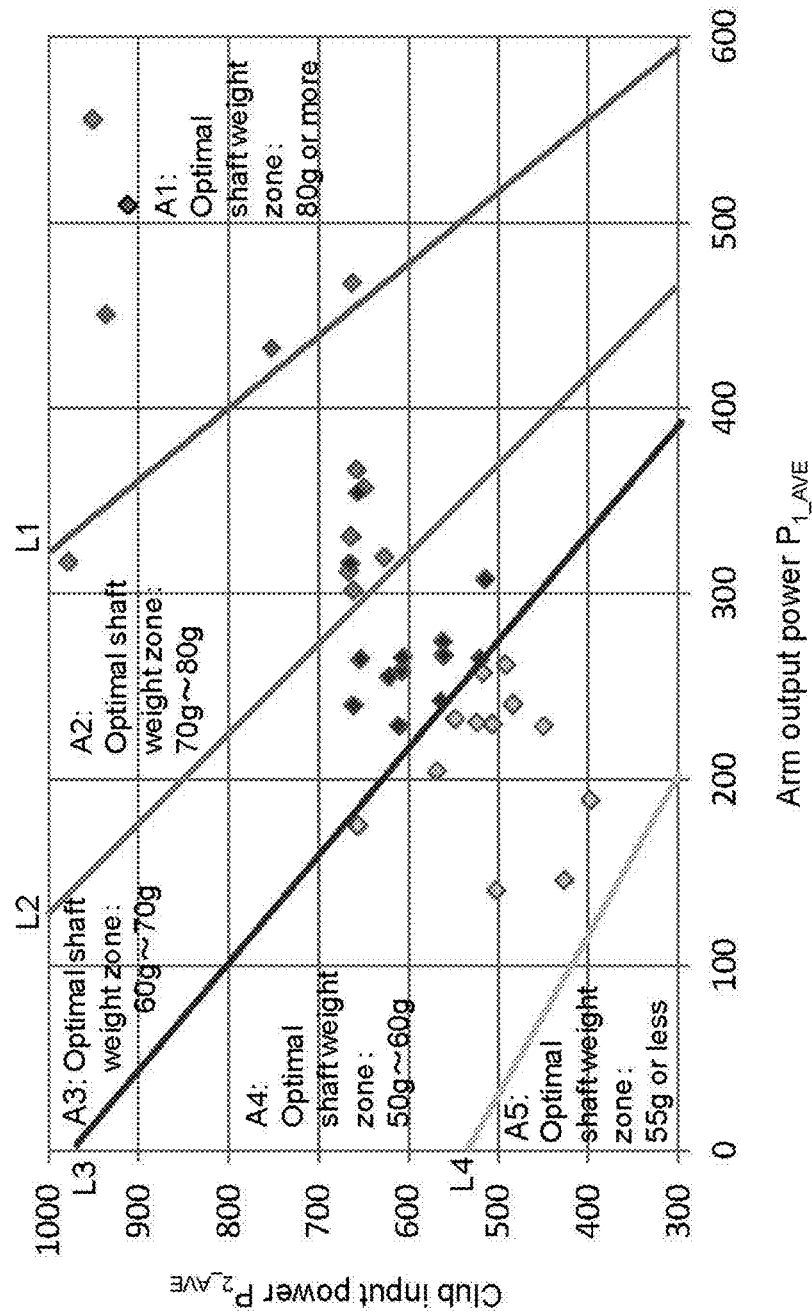
FIG. 14 is a diagram showing an arm output power-club input power plane divided into regions corresponding to a plurality of optimal shaft weight zones.

In the field C9, a plot region, which is a $P_{1\_AVE}$-$P_{2\_AVE}$ plane, such as shown in FIG. 14, whose horizontal axis is the arm output power $P_{1\_AVE}$ and whose vertical axis is the club input power $P_{2\_AVE}$ is displayed, and in this plot region, points corresponding to the arm output power $P_{1\_AVE}$ and the club input power $P_{2\_AVE}$ of the golfer 7 are plotted and displayed. In the field C9, the fact that the horizontal axis and the vertical axis of the plot region respectively represent the "strength with which wrist cock is held" and the "strength with which the wrist cock is released" is clearly indicated by text added to the axes. Also, this plot region is divided into the abovementioned regions A1 to A5 respectively corresponding to the shaft weight zones to be recommended to the golfer 7. These regions are displayed, in the plot region, in different modes so that it is clear that the regions correspond to different shaft weight zones. For example, boundary lines are drawn between the regions or the different regions are given different colors or patterns. Also, in each region, a symbol representing the specifications of the shaft 40 belonging to the corresponding shaft weight zone is displayed. In the example of FIG. 22, symbols such as "8X·S" and "7X·S", are displayed, with these numerical values, such as 8 and 7, signifying the shaft weight zone, and the letters, such as X and S, indicating the flex.

Incidentally, concepts such as the strength with which the wrist cock is held and the strength with which the wrist cock is released are not known to all users. Thus, in a field C11, images showing "the power produced during the swing and the relationship between the arm and the club" are displayed. In the present embodiment, a moving image for explaining the strength with which the wrist cock is released and the strength with which the wrist cock is held is displayed. This moving image is a moving image showing a graphic (hereinafter, arm graphic) schematically showing the arm of the golfer 7 and a graphic (hereinafter, club graphic) schematically showing the golf club 4 gripped by the golfer 7 moving like a double pendulum with the swing motion.

Here, assume that timings during the swing motion are represented with an ordinal number i=1, 2, ..., N (N being an integer of 2 or more) in time sequence. At this time, the moving image that is displayed in the field C11 includes N images I(i) that are reproduced frame-by-frame in time sequence. On the image I(i), an arm graphic $G_3(i)$ is displayed in the position where the arm exists at the i-th timing and a club graphic $G_4(i)$ is displayed in the position where the golf club 4 exists at the i-th timing. FIGS. 23A to 23F show examples of the images I(i), with the images of FIGS. 23A to 23F being in time sequence in the stated order.

Also, on the image I(i), a first graphic $G_1(i)$ representing the strength with which the wrist cock is held at the i-th timing and a second graphic $G_2(i)$ representing the strength with which the wrist cock is released at the same i-th timing are displayed, in addition to the arm graphic $G_3(i)$ and the club graphic $G_4(i)$. These graphics $G_1(i)$ to $G_4(i)$ corresponding to the same timing are displayed simultaneously on one image I(i). The strength with which the wrist cock is held at the i-th timing is the arm output power $P_i$ at the i-th timing, and the strength with which the wrist cock is released at the i-th timing is the club input power $P_2$ at the i-th timing. The first graphic $G_1(i)$ on the image I(i) takes a form that depends on the size of the arm output power $P_i$ at the i-th timing, and the second graphic $G_2(i)$ takes a form that depends on the size of the club input power $P_2$ at the i-th timing. More specifically, in the present embodiment, the first graphic $G_1$ (i) is displayed larger the larger the arm output power $P_1$ at that timing, and the second graphic $G_2(i)$ is displayed larger the larger the club input power $P_2$ at that timing. Note that the size of the arm output power $P_1$ and the club input power $P_2$ may be represented by changing the color or the like of the first graphic $G_1$ (i) and the second graphic $G_2(i)$. Also, the arm output power $P_1$ and the club input power $P_2$ that determine the form of the first graphic $G_1(i)$ and the second graphic $G_2(i)$ need not be values peculiar to the golfer 7 that are based on measurement data, and can be the arm output power $P_1$ and the club input power $P_2$ at the time of a general swing motion. In this case, in the field C11, the same moving image is reproduced regardless of the golfer 7.

Incidentally, conceptually, the power that holds the wrist cock is associated with the arm, and the power that releases the wrist cock is associated with the golf club 4. Accordingly, in the present embodiment, the first graphic $G_1(i)$ is disposed to overlap the arm graphic $G_3(i)$, and the second graphic $G_2(i)$ is disposed to overlap the club graphic $G_4(i)$. However, disposition of the first graphic $G_1(i)$ and the second graphic $G_2(i)$ is not limited thereto, and, as another preferable example, the first graphic $G_1(i)$ can also be disposed in a vicinity of the arm graphic $G_3(i)$, and the second graphic $G_2(i)$ can also be disposed in a vicinity of the club graphic $G_4(i)$. The first graphic $G_1(i)$ and the arm graphic $G_3(i)$ can also be represented as roughly one graphic. In this case, for example, a configuration can be adopted in which the form of the graphic that represents the arm is changed according to the size of the arm output power $P_1$. The same applies to the second graphic $G_2(i)$ and the club graphic $G_4(i)$, and in this case, a configuration can be adopted in which, for example, the form of the graphic that represents the golf club 4 is changed according to the size of the club input power $P_2$. Also, the first graphic $G_1(i)$ can be disposed in the portion corresponding to the shoulder of the arm graphic or in a vicinity thereof, and the second graphic $G_2(i)$ can be disposed in the portion corresponding to the wrist of the arm graphic or in a vicinity thereof. The user who views a moving image such as the above is able to intuitively understand what the movement for holding the wrist cock and the movement for releasing the wrist cock during the golf swing mean.

Figure 24:
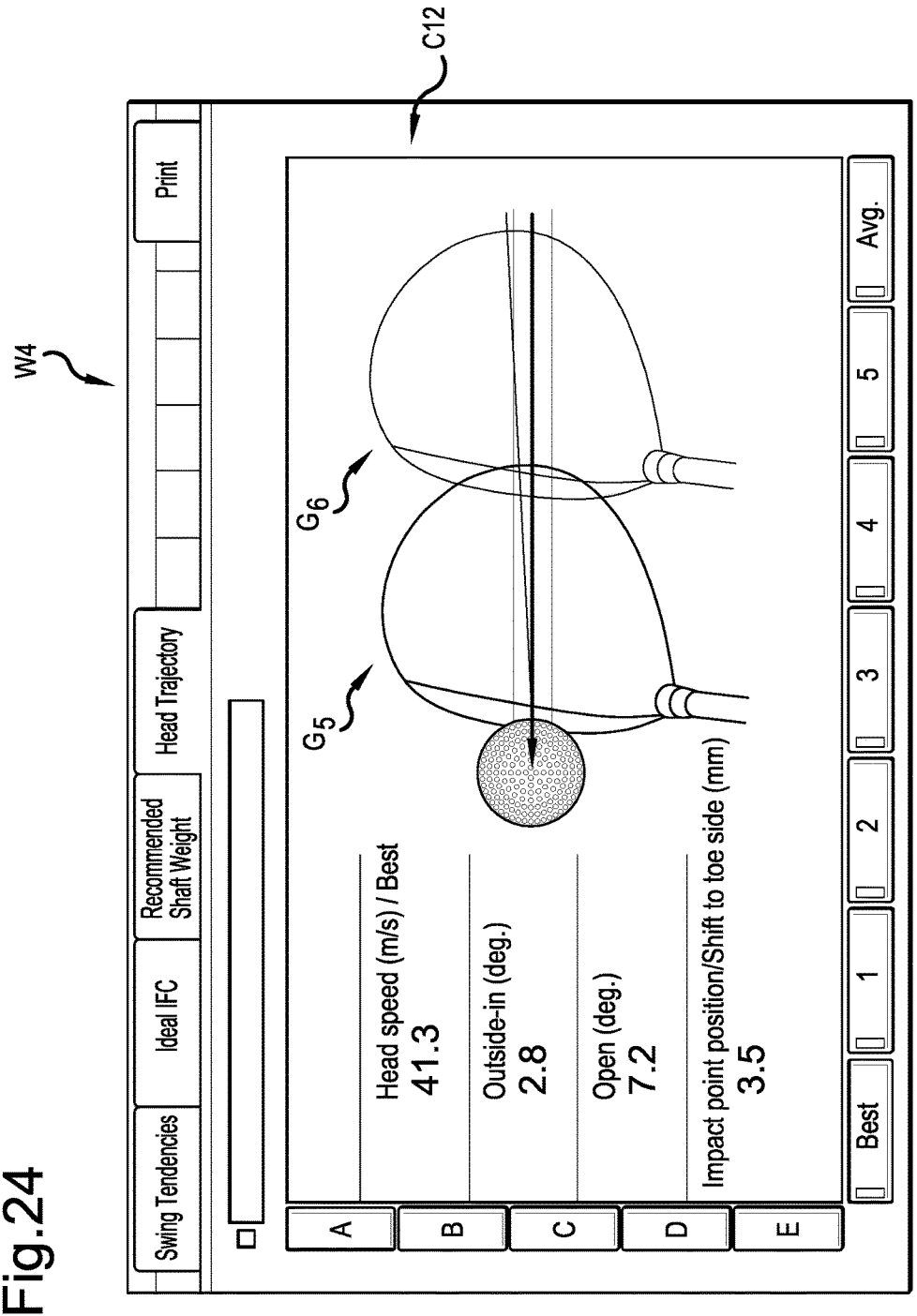
FIG. 24 is yet another diagram showing a GUI screen displaying analysis results.

The screen W4 shown in FIG. 24 is a screen corresponding to a "head trajectory" tab, and principally displays the behavior of the head 41. On the screen W4, the head speed $V_{hi}$ immediately before impact, the angle of the head trajectory, the face angle at the time of impact and the impact point determined in the head behavior determination process are quantitatively displayed numerically. Also, in a field C12, head graphics $G_5$ and $G_6$, which are graphics representing the head at two timings in a vicinity of impact, are simultaneously displayed side by side. The head graphic $G_5$ represents the head at the time of impact, and the head graphic $G_6$ represents the head immediately before impact. Also, the head graphic $G_5$ in the field C12 is displayed to incline according to the angle of the head trajectory mentioned above. The user is thereby able to correctly understand intuitively whether the head trajectory of the golfer 7 is outside-in or inside-out. Note that slope of head graphic $G_5$ can also be set according to the face angle at the time of impact.

3. Modification

Although a number of embodiments of the present invention were described above, the present invention is not limited to the above embodiments and various modifications can be made without departing from the spirit of the invention. For example, the following modifications can be made. Also, the gists of the following modifications can be combined as appropriate.

3-1

In the above embodiments, the arm output powers $P_1$ and $P_{1\_AVE}$, which are the strength with which the wrist cock is held, and the club input powers $P_2$ and $P_{2\_AVE}$, which are the strength with which the wrist cock is released, were calculated based on measurement data obtained by an inertial sensor unit, although at least one side of these indicators can also be calculated based on measurement data obtained by a camera unit.

3-2

In the above embodiments, flexural rigidity was evaluated as the rigidity of the shaft, but torsional rigidity may be evaluated instead. The value of torsional rigidity (hereinafter, GJ value) can also be measured or calculated at a plurality of positions in the direction in which the shaft 40 extends. That is, the distribution of torsional rigidity at a plurality of positions in the direction in which the shaft 40 extends may be taken as the rigidity of the shaft. In this case, the GJ value (optimal GJ value) suitable for the golfer 7 will be determined as the optimal rigidity indicator, although as the second swing indicator for determining the optimal GJ value, a suitable indicator whose correlation with the optimal GJ value is recognized can be used. As such a second swing indicator, the following indicators that are described in JP 2014-212862A can be used, for example.

(1) The size of the amount of change in the grip angular velocity $\omega_x$ per unit time from the time that the grip angular velocity $\omega_y$ is maximized to the time of impact.
(2) The amount of change in the grip angular velocity $\omega_z$ in a vicinity of top.
(3) The size of the amount of change in the grip angular velocity $\omega_z$ from the time of top to the time at which the grip angular velocity $\omega_y$ is maximized during the downswing.

Even with this modification, the optimal GJ value can be determined from a second swing indicator that is based on measurement data that is obtained in the measurement process, by calculating an approximate equation representing the relationship between the second swing indicator and the optimal GJ value in advance through testing, and storing the calculated approximate equation in the storage part 23.

Also, a configuration may be adopted in which a kick point or torque suitable for the golfer 7 is determined as the optimal rigidity indicator, instead of or in addition to the IFC or flex suitable for the golfer 7. Note that torque is an indicator representing the torsional rigidity of the shaft 40 as a whole.

3-3

In the above embodiments, images I(i) for i=1, 2, ..., N were displayed in moving image format, but these N images I(i) can also be displayed in the mode of still images. That is, images such as shown in FIGS. 23A to 23F can be simultaneously displayed on the same screen. At this time, it is preferable to array the images I(i) in time sequence. It is also possible to display only one image such as shown in FIG. 22. In the image shown in FIG. 22, the graphics $G_1(i)$ to $G_4(i)$ at various timings are simultaneously displayed on the one image as with a strobe image. Accordingly, even with only one image such as this, the strength with which the wrist cock is held and the strength with which the wrist cock is released during the swing motion can be intuitively understood.

REFERENCE SIGNS LIST

1 Inertial sensor unit
2 Fitting device (GUI display device)
3 Program (GUI display program)
4 Golf club
5 Camera system
7 Golfer
24A Acquisition part
24B Grip behavior derivation part
24C Shoulder behavior derivation part
24D Calculation part
24E Determination part
24F Selection part
24G Display control part
40 Shaft
41 Head
42 Grip
W1-W5 GUI screen
$G_1(i)$ First graphic
$G_2(i)$ Second graphic
$G_3(i)$ Arm graphic
$G_4(i)$ Club graphic
$G_5$ Head graphic (first head graphic)
$G_6$ Head graphic (second head graphic)

The invention claimed is:

1. A non-transitory recording medium storing a GUI display program configured to display a GUI screen, the program causing a computer to execute the step of:
acquiring measurement data obtained by measuring a swing motion of a golf club by a golfer;
calculating, based on the measurement data, a first indicator representing a strength with which a wrist cock is held at an i-th timing during the swing motion of the golf club, and a second indicator representing a strength with which the wrist cock is released at the i-th timing, where i=1, 2, ..., N (N being an integer of 2 or more); and
creating an image I(i) simultaneously displaying, on the GUI screen, a first graphic $G_1(i)$ having a form depending on a size of the first indicator at an i-th timing during the swing motion of the golf club, and a second graphic $G_2(i)$ having a form depending on a size of the second indicator at the i-th timing, an arm graphic G3(i) representing an arm of the golfer at the i-th timing, and a club graphic G4(i) representing the golf club at the i-th timing, where i=1, 2, ..., N (N being an integer of 2 or more); and
displaying the image I(i) in a mode of a moving image in time sequence where i=1, 2, ..., N.

2. The non-transitory recording medium according to claim 1, the program causing the computer to further execute the step of:
determining an optimal shaft weight, which is a shaft weight suitable for the golfer, according to the first indicator and the second indicator,
displaying the optimal shaft weight on the GUI screen.

* * * * *